(12) United States Patent
Baba

(10) Patent No.: US 8,350,166 B2
(45) Date of Patent: Jan. 8, 2013

(54) POSITION INDICATOR

(75) Inventor: Yasuhiro Baba, Yachiyo-machi (JP)

(73) Assignee: Wacom Co., Ltd., Saitama (JP)

( * ) Notice: Subject to any disclaimer, the term of this patent is extended or adjusted under 35 U.S.C. 154(b) by 572 days.

(21) Appl. No.: 12/628,765

(22) Filed: Dec. 1, 2009

(65) Prior Publication Data

US 2010/0212976 A1 Aug. 26, 2010

(30) Foreign Application Priority Data

Feb. 24, 2009 (JP) ................................. 2009-040882

(51) Int. Cl.
G06F 3/033 (2006.01)
(52) U.S. Cl. ................... 178/19.03; 345/179; 178/19.01
(58) Field of Classification Search .................. 345/179; 178/18.01, 19.01, 19.03
See application file for complete search history.

(56) References Cited

U.S. PATENT DOCUMENTS

2007/0070053 A1* 3/2007 Lapstun et al. ............... 345/179
2010/0170726 A1* 7/2010 Yeh et al. .................. 178/19.03

FOREIGN PATENT DOCUMENTS

JP 63-070326 A 3/1988
JP 2001-319831 A 11/2001

* cited by examiner

Primary Examiner — Adam R Giesy
(74) Attorney, Agent, or Firm — Seed IP Law Group PLLC

(57) ABSTRACT

A position indicator comprises a case having a housing portion and an opening; a rod with a substantially bar-like body and an end and housed in the housing portion such that the end of the rod protrudes outside the case through the opening; and a sealing member attached to the opening and having an aperture into which the rod is inserted such that a gap between the aperture and the rod is sealed. A position detecting system comprises a position detecting device having a plurality of superimposed coils, a processing unit; and a position indicator. When the indicator approaches the position detecting device, a signal is induced by one of the coils, and the processing unit determines a position of the indicator based on the signal and a coordinate of the coil that induced the signal.

15 Claims, 16 Drawing Sheets

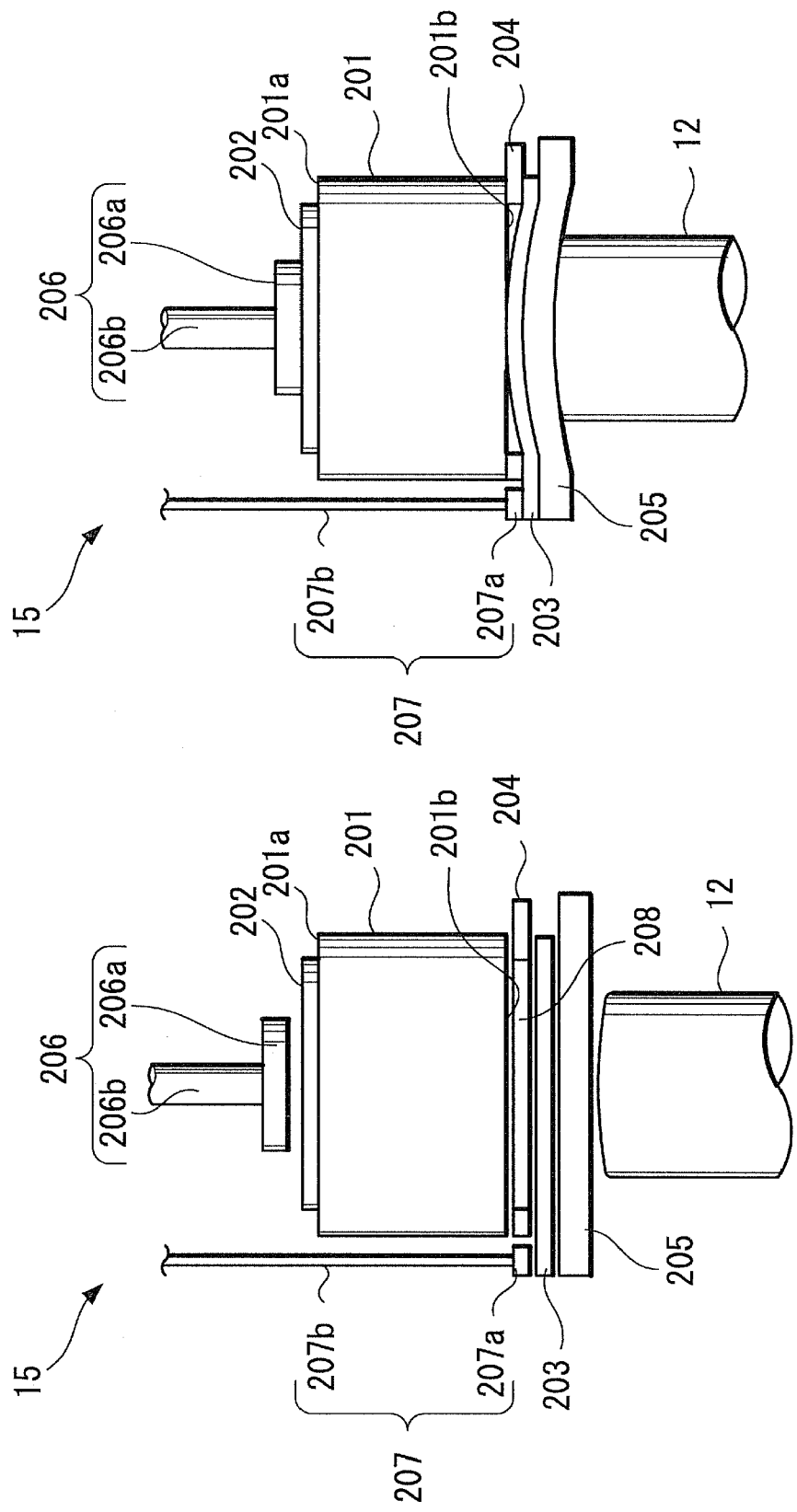

POSITION INDICATOR

CROSS REFERENCES TO RELATED APPLICATIONS

The present invention contains subject matter related to Japanese Patent Application JP 2009-040882 filed in the Japanese Patent Office on Feb. 24, 2009, the entire contents of which being incorporated herein by reference.

BACKGROUND OF THE INVENTION

1. Field of the Invention

The present invention relates to a position indicator for performing an input operation such as a pointing operation, a handwritten character input operation, a hand-drawn illustration input operation or the like.

2. Description of the Related Art

In recent years, input devices have been used as input units for a personal computer for example. Such input devices comprise a pen-like position indicator and a position detecting device having an input surface from which an input operation such as a pointing operation, a handwritten character input operation, a hand-drawn illustration input operation or the like is performed with the position indicator.

Technologies based on which a position indicator works as an input means include electromagnetic resonance technology. A position indicator based on the electromagnetic resonance technology includes a resonant circuit resonating with an electromagnetic wave of a specified frequency transmitted from the position detecting device, and the position of the position indicator is indicated to the position detecting device by transmitting a resonant signal generated in the resonant circuit to the position detecting device. A position indicator which operates based on the electromagnetic resonance technology generally includes a substantially bar-like rod and a case for housing the rod and the resonant circuit therein. The case has an opening from which a pen tip, formed at one end in the axial direction of the rod, protrudes to the outside of the case (see, for example, Japanese Unexamined Patent Application Publication No. 2001-319831).

SUMMARY OF THE INVENTION

In recent years, there is a desire to provide a position indicator having good water resistance and dust resistance so that the position indicator can be adapted for outdoor use. However, since a case of a conventional position indicator has an opening from which the pen tip of the rod protrudes to the outside of the case, a clearance is formed between the rod and the case. As a result, water, dust and the like may enter into the case through the clearance, which would adversely affect a resonant circuit and other elements housed in the case, and that may cause the position indicator to fail.

In view of the aforesaid problems, an object of the present invention is to provide a position indicator having a waterproof and dustproof structure capable of preventing water, dust and the like from entering into the case.

A position indicator according to an aspect of the present invention includes: a substantially bar-like rod, and a case having a hollow portion for housing the rod and an opening from which one end of the rod protrudes to the outside in a state where the rod is housed in the hollow portion. The position indicator further includes an elastic member attached to the case, the elastic member having a hole (i.e., an aperture), into which the rod is inserted, so that tight contact between the hole and the rod is maintained.

In the position indicator according to the present invention, the elastic member that maintains tight contact between the rod and the hole, prevents water, dust and the like from entering into the case from the periphery of the rod. As a result, it is possible to provide a position indicator capable of being used in an environment that has water, dust and the like.

BRIEF DESCRIPTION OF THE DRAWINGS

FIGS. 4A and 4B illustrate a variable capacitor of the position indicator according to the first embodiment of the present invention;

FIGS. 5A to 5D illustrate an elastic member of the position indicator according to the first embodiment of the present invention, wherein FIG. 5A is a top view, FIG. 5B is a bottom view, FIG. 5C is a front view, and FIG. 5D is a cross section;

DETAILED DESCRIPTION OF THE PREFERRED EMBODIMENT(S)

Figure 1:
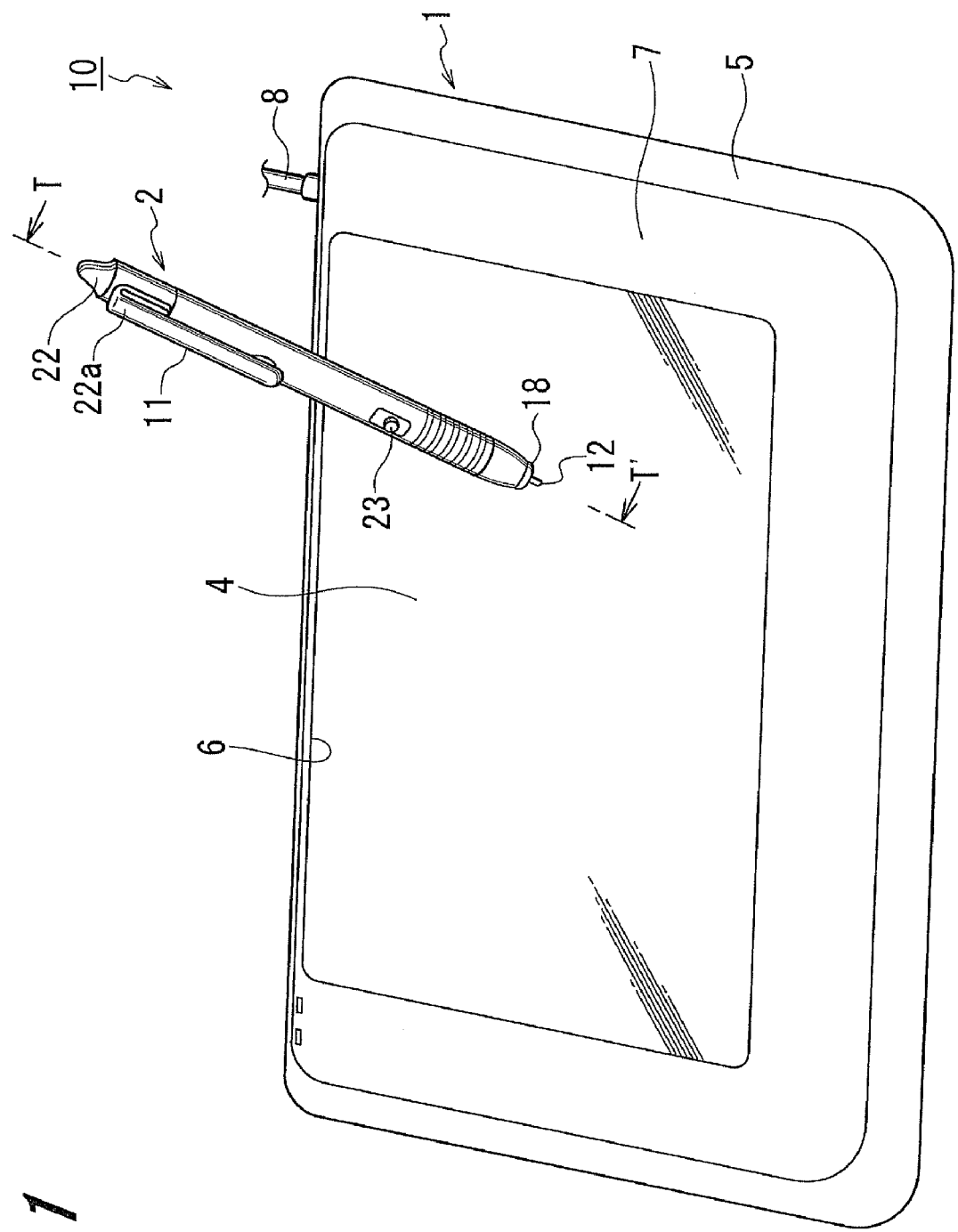
FIG. 1 is a perspective view showing an input device according to a first embodiment of the present invention.

A position indicator according to a first, second, third and fourth embodiments of the present invention will be described below with reference to FIGS. 1 to 21. However the present invention is not limited to these embodiments. Note that in the drawings like components are denoted by like numerals.

Description will be given in the following order:
1. First Embodiment
   1-1. Configuration Example of Input Device
   1-2. Circuit Configuration of Input Device
2. Second Embodiment
3. Third Embodiment
4. Fourth Embodiment

[Input Device]

First, the brief configuration of an input device 10 according to a first embodiment of the present invention will be described below with reference to FIG. 1.

The input device 10 according to the present embodiment includes a position detecting device 1 and a position indicator 2 that inputs information to the position detecting device 1.

[Position Detecting Device]

The position detecting device 1 is connected to an external device (not shown) such as a personal computer, a PDA (Personal Digital Assistant) and the like, through a cable 8, so as to be used as an input device of the external device. Incidentally, although not shown in the drawings, the position detecting device 1 may also be built in a personal computer and the like.

The position detecting device 1 includes a detection section 4 for detecting the position indicated by the position indicator 2, and a thin rectangular parallelepiped-shaped hollow case 5 having the detection section 4. The case 5 includes an upper case 7 and a lower case (not shown) coupled with the upper case 7. The upper case 7 has an opening 6 from which an input surface of the detection section 4 is exposed, and the detection section 4 is fitted into the opening 6. By using the position detecting device 1 having the aforesaid configuration, an input operation such as a pointing operation, a handwritten character input operation, a hand-drawn illustration input operation or the like is performed through the position indicator 2.

[Position Indicator]

Next, the position indicator 2 according to the present embodiment will be described below with reference to FIGS. 2 to 6.

The position indicator 2 indicates its own position to the position detecting device 1 based on the electromagnetic resonance technology. Specifically, the position indicator 2 has a resonant circuit which resonates with an electromagnetic wave of a specific frequency transmitted from the position detecting device 1. Further, the position indicator 2 transmits a resonance signal detected in the resonant circuit to the position detecting device 1, and thereby indicates its own position to the position detecting device 1.

Figure 2:
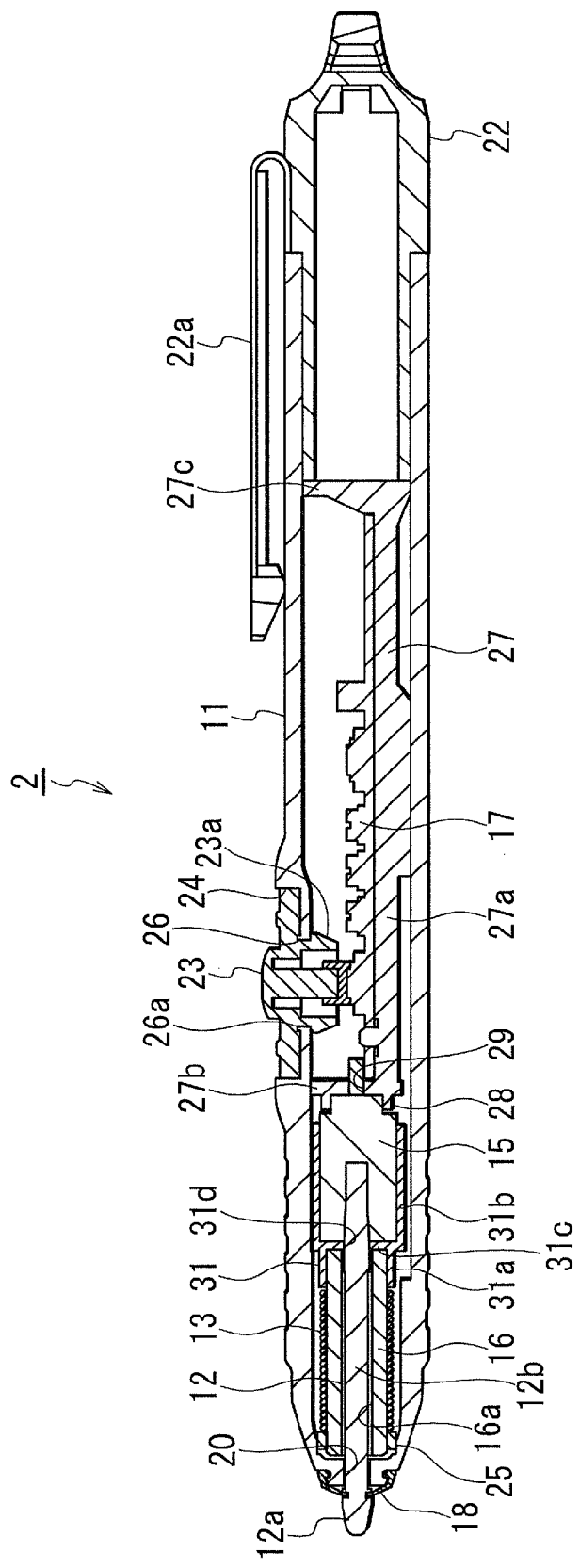
FIG. 2 is a cross section of the position indicator along line T-T' shown in FIG. 1.

As shown in FIG. 2, the position indicator 2 includes a case 11, a rod 12, a coil 13, a variable capacitor 15, a ferrite core 16, a printed circuit board 17 and a rubber cap 18.

The case 11 serves as an exterior part of the position indicator 2. The case 11 has a substantially circular tubular shape with open ends. One end of the case 11 has a substantially conical shape whose tip has an opening 20, and an engaging-receiving portion 21 to which the rubber cap 18 is fixed. A cap member 22 is fitted into the opening of the other end of the case 11 so that the opening of the other end 11 is closed. The cap member 22 may be fixed by a fixing method known in the art, such as with an adhesive or the like. A clip 22a is attached to an outer surface of the cap member 22.

A fitting recessed portion 24 in which a switch member 23 is fitted is formed at substantially the axial center of the case 11. An opening hole 26 for inserting a pressing projection 23a of the switch member 23 is formed in the fitting recessed portion 24. A lip 26a is formed around the opening hole 26. The lip 26a is engaged to the switch member 23.

Further, the variable capacitor 15, the ferrite core 16, the printed circuit board 17, on which electronic components are mounted, and the like are housed in the case 11.

The ferrite core 16 is formed, for example, in a circular tubular shape having a through-hole 16a into which the rod 12 is inserted. Further, a ring-shaped buffer member 25 is attached to the side of one end in the axial direction of the ferrite core 16. The buffer member 25 is made of an elastic material, preferably of a silicon rubber or the like. With such an arrangement, with the elastic buffer member 25 attached to the one end of the ferrite core 16, when an external impact force is applied, the impact force can be absorbed or reduced due to the elastic deformation of the buffer member 25.

Further, the coil 13, which constitutes the resonant circuit, is wound around the periphery of the ferrite core 16. Both ends (not shown) of the coil 13 are electrically connected to the electronic components of the printed circuit board 17. The printed circuit board 17 is attached to a supporting member 27.

The supporting member 27 has a substantially plate-like mounting portion 27a, a first partition wall 27b formed on the side of one end in the longitudinal direction of the mounting portion 27a, and a second partition wall 27c formed on the side of the other end in the longitudinal direction of the mounting portion 27a. The printed circuit board 17 is attached to the mounting portion 27a of the supporting member 27. The first partition wall 27b and the second partition wall 27c are perpendicular to the mounting portion 27a on both end side of the mounting portion 27a. Further, the first partition wall 27b is provided with a connecting hole 29 and an engaging piece 28 that is engaged with an end portion of the variable capacitor 15.

The supporting member 27 is housed in the case 11 such that the mounting portion 27a extends along the axial direction of the case 11. Further, the first partition wall 27b is arranged on one side in the axial direction of the case 11, and the second partition wall 27c is arranged on the other side in the axial direction of the case 11. Thus, the inner space of the case 11 is separated into three parts by the first partition wall 27b and the second partition wall 27c of the supporting member 27. The printed circuit board 17 is disposed in the middle part of the three parts of the case 11 separated by the first partition wall 27b and the second partition wall 27c.

FIGS. 4A and 4B show a concrete configuration of the variable capacitor 15. The variable capacitor 15 includes a substantially disc-shaped dielectric 201, a first electrode 202 attached on one surface 201a of the dielectric 201, and a second electrode 203 provided on the side of the other surface 201b of the dielectric 201. The second electrode 203 is a flexible member, and is arranged on the side of the other surface 201b of the dielectric 201 via a ring-shaped spacer 204. Further, a bar-like rod 12 is provided on the side of the second electrode 203 opposite to the dielectric 201 via an elastic body 205.

A first terminal 206 is provided on the side of one surface of the first electrode 202. The first terminal 206 includes a disc-shaped flange portion 206a, and a lead portion 206b extending from substantially the center of one surface of the flange portion 206a. When a pen pressure is applied to the rod 12, the flange portion 206a is brought into contact with the one surface of the first electrode 202, so that the flange portion 206a is electrically connected to the first electrode 202. Further, the lead portion 206b of the first terminal 206 is electrically connected to the printed circuit board 17 (see FIG. 3).

A second terminal 207 is provided on the end portion of the second electrode 203. Similar to the first terminal 206, the first terminal 207 includes a disc-shaped flange portion 207a, and a lead portion 207b extending from substantially the center of one surface of the flange portion 207a. When a pen pressure is applied to the rod 12, the flange portion 207a is brought into contact with the end portion of one surface of the second electrode 203, so that the flange portion 207a is electrically connected to the second electrode 203.

In the variable capacitor 15 having the aforesaid configuration, in a state where there is no pressure or displacement applied to the rod 12 (namely, when the variable capacitor 15 is in an initial state), the other surface 20 1b of the dielectric 201 and the second electrode 203 are spaced apart from each other by the spacer 204 (see FIG. 4A). Thus, an air layer 208 is formed between the other surface 20 1b of the dielectric 201 and the second electrode 203, the air layer 208 having the same thickness as that of the spacer 204. The initial capacitance value between the terminal 206 and the terminal 207 is substantially a serial combined capacitance of the capacitance contributed by the dielectric 201 and the capacitance contributed by the air layer 208, which has a relative dielectric constant of 1.0; therefore the capacitance value is very small.

However, as shown in FIG. 4B, if a pressure is applied to the rod 12, the second electrode 203 will be bent toward the side of the dielectric 201, and the thickness of the air layer 208 will become smaller than that of the spacer 204. Since the capacitance contributed by the air layer 208 increases in inverse proportion to the thickness of the air layer 208, the capacitance between the terminal 206 and the terminal 207 will increase due to the increase of the capacitance contributed by the air layer 208.

Then, after the second electrode 203 is brought into contact with the other surface 201b of the dielectric 201, the capacitance value between the terminal 206 and the terminal 207 increases substantially in proportion to the contact area between the second electrode 203 and the other surface 201b of the dielectric 201. The pressure, i.e. the pen pressure, applied to the rod 12 is detected by detecting the change of the capacitance value between the first terminal 206 and the second terminal 207.

When no pen pressure is applied to the rod 12, due to the elastic restoring force of the elastic body 205 and the weight of the rod 12, the second electrode 203 will move away from the other surface 20 1b of the dielectric 201.

Figure 3:
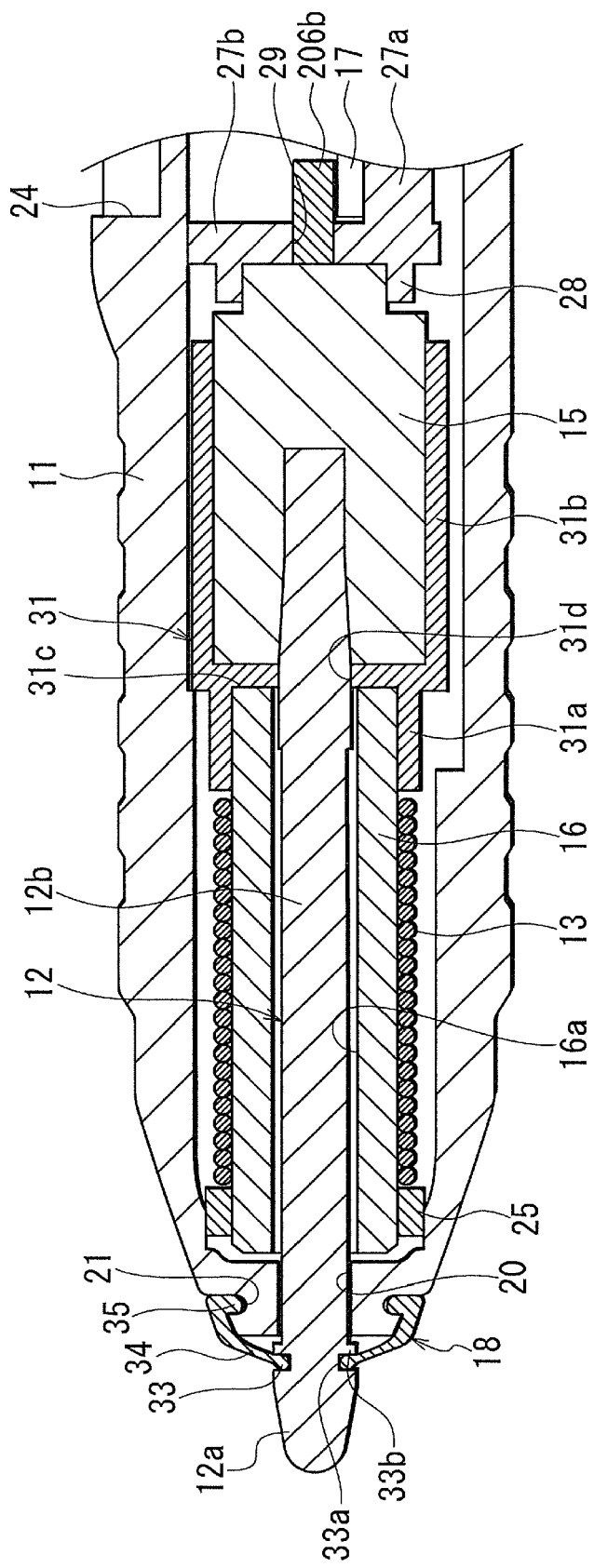
FIG. 3 is a cross section of a primary portion of the position indicator according to a first embodiment of the present invention.
Figure 5A:
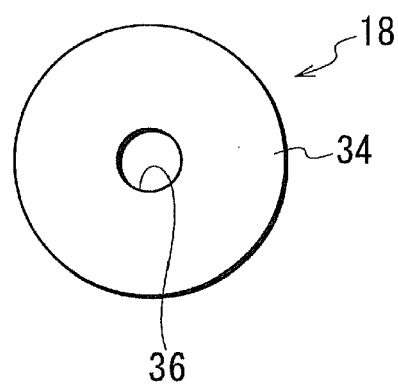
Figure 5B:
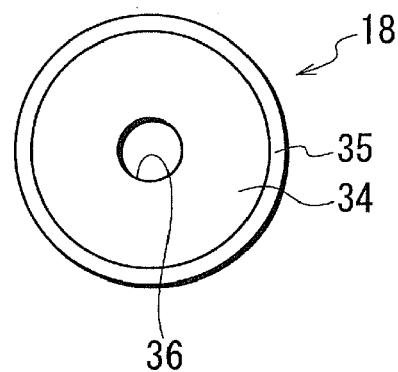
Figure 5C:
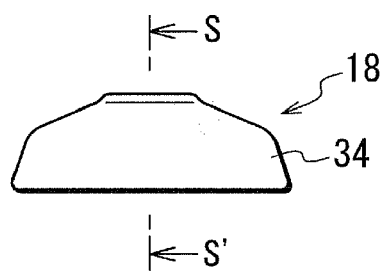
Figure 5D:
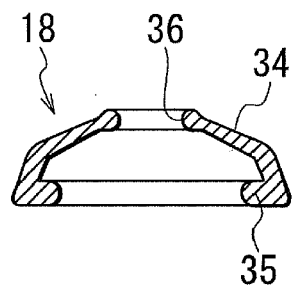

Further, as shown in FIG. 3, the circumferential surface of the variable capacitor 15 is covered with an elastic protective member 31 made of silicon rubber or the like. The protective member 31 includes a first tubular portion 31a and a second tubular portion 31b. An insertion hole 31d, into which the rod 12 is inserted, is formed in a surface 31c that connects the first tubular portion 31a and the second tubular portion 31b.

The first tubular portion 31a is formed in a substantially circular tubular shape whose inner diameter substantially equals to the outer diameter of the ferrite core 16. The first tubular portion 31a has a through-hole into which the other end of the ferrite core 16 is inserted. Further, the second tubular portion 31b is formed continuously from the side of the other end of the first tubular portion 31a. The first tubular portion 31a and the second tubular portion 31b are arranged so that the central axes thereof are coaxial.

The second tubular portion 31b is formed in a substantially circular tubular shape with an inner diameter substantially equal to the outer diameter of the variable capacitor 15. The second tubular portion 31b has a through-hole into which the variable capacitor 15 is fitted. The second tubular portion 31b substantially covers the entire circumferential surface of the variable capacitor 15, so that water, dust or the like is prevented from entering into the variable capacitor, thus keeping the capacitor operational.

Although the present embodiment is described using an example in which the protective member 31 has a shape formed by connecting the two circular tubes in the axial direction, the present invention is not limited thereto. For example, the protective member 31 may also have other shapes as long as the shape of a through-hole of the second tubular portion 31b corresponds to the shape of the variable capacitor 15.

Next, the rod 12 and the rubber cap 18 will be described below with reference to FIGS. 3, 5A, 5B, 5C, 5D and 6.

The rod 12 is a substantially bar-like member. The rod 12 includes a pen tip 12a formed at one end thereof and a shaft portion 12b extending continuously from the pen tip 12a. The rod 12 is housed in the case 11 so that the shaft portion 12b thereof is inserted into the through-hole 16a of the ferrite core 16 extending along the axial direction of the case 11. Further, the end of the shaft portion 12b is inserted into the insertion hole 31d so as to be attached to the variable capacitor 15.

Figure 6:
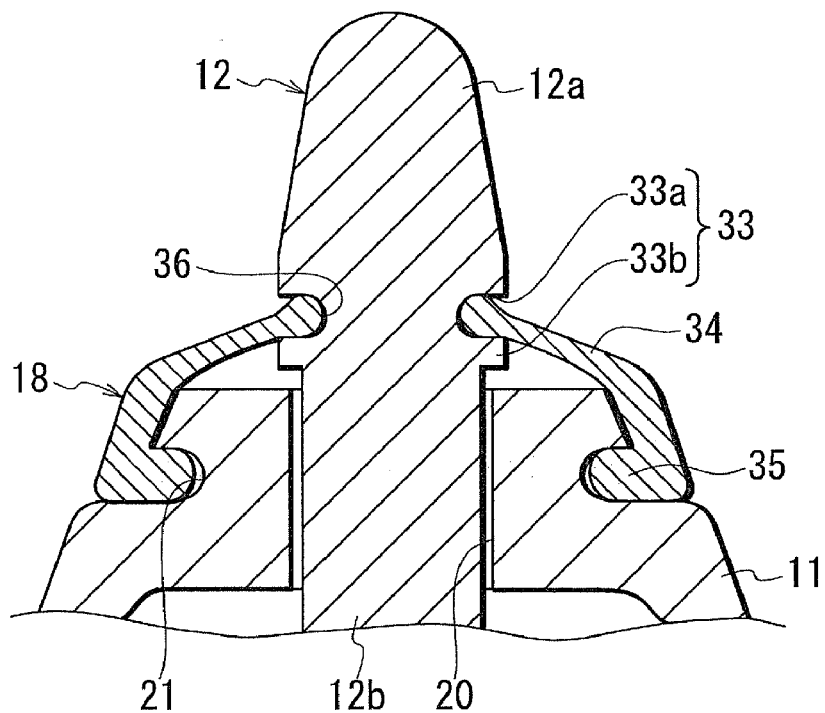
FIG. 6 is a cross section of a fitting state between a rod and the elastic member of the position indicator according to the first embodiment of the present invention.

As shown in FIGS. 3 and 6, the pen tip 12a is substantially cone-shaped. When the rod 12 is housed in the case 11, the pen tip 12a protrudes to the outside from the opening 20 of the case 11. Further, the pen tip 12a has a fitting-receiving portion 33 formed therein, the fitting-receiving portion 33 including a groove 33a and a flange portion 33b. The fitting-receiving portion 33 is formed on the side of the other end in the axial direction of the pen tip 12a, at a position where the pen tip 12a is connected to the shaft portion 12b. The groove 33a of the fitting-receiving portion 33 is, for example, continuously formed along the circumferential direction of the pen tip 12a. The flange portion 33b is a flanged portion continuously protruding along the circumferential direction of the pen tip 12a. The flange portion 33b is arranged closer to the side of the shaft portion 12b than the groove 33a. Further, the rubber cap 18 is fitted into the fitting-receiving portion 33.

As shown in FIGS. 5A to 5D, the rubber cap 18 (shown as a concrete example of an elastic member) is substantially formed in a hollow truncated cone shape having two open mutually facing surfaces. The rubber cap 18 includes a tapered portion 34 and a fixing portion 35 continuing from the tapered portion 34.

The rubber cap 18 has a through-hole (i.e., an aperture) 36 formed in the top portion thereof, so that the pen tip 12a of the rod 12 passes through the through-hole 36. Further, the edge of the through-hole 36 is fitted into the fitting-receiving portion 33 of the pen tip 12a. The diameter of the through-hole 36 is substantially equal to or smaller than the diameter of the groove 33a of the fitting-receiving portion 33 of the pen tip 12a. In other words, the rubber cap 18 is tightly fitted into the fitting-receiving portion 33. As a result, the gap between the periphery of the rod 12 and the through-hole 36 can be sealed by maintaining tight contact between the periphery of the rod 12 and the through-hole 36. Consequently, water, dust and the like will be prevented from entering into the case 11 from the periphery of the rod 12. Incidentally, the rubber cap 18 may also be fixed to the rod 12 by an adhesive.

Note that although the present embodiment is described using an example in which the groove 33a is continuously formed in the periphery of the pen tip 12a, the present invention is not limited thereto. For example, the present invention also includes a possible configuration in which the pen tip 12a has at least a recessed portion formed therein, and the through-hole 36 of the rubber cap 18 and the recessed portion are fitted to each other.

Further, the present invention also includes another possible configuration in which, when the rubber cap 18 is fitted into the fitting-receiving portion 33, the flange portion 33b of the pen tip 12a abuts the periphery of the through-hole 36. With such a configuration, the flange portion 33b serves as a retaining member for the rod 12, and therefore the rod 12 cannot escape from the case 11 when subjected to an impact caused by dropping or the like.

The fixing portion 35 is continuously formed in an end portion of the tapered portion 34 opposite the end portion where the through-hole 36 is formed. The case 35 substantially is formed in a hook shape projecting to the inside of the rubber cap 18. Further, the fixing portion 35 is engaged with the engaging-receiving portion 21 of the case 11, and thereby the rubber cap 18 is fixed to the case 11 (see FIG. 6). Further, the end portion (where the engaging-receiving portion 21 is formed) of the case 11 is taper-shaped. Thus, the fixing portion 35 will be engaged with the engaging-receiving portion 21, and the efficiency of the attaching work of the rubber cap 18 will be improved.

Further, the rubber cap 18 is made of an elastic material such as a rubber, for example, so that elasticity is also imparted to the tapered portion 34. Due to the elastic force of the tapered portion 34, the rod 12 is biased toward a direction in which the pen tip 12a protrudes to the outside from the opening 20 of the case 11. In other words, the rubber cap 18 also serves as a biasing means.

In the case where the rod 12 is not biased toward a direction in which the pen tip 12a protrudes to the outside from the opening 20 of the case 11, due to a friction between the rod 12 and the rubber cap 18, the rod 12 will be fixed at the operating position of the variable capacitor 15, and the variable capacitor 15 will be constantly in ON state. Further, due to the friction between the rod 12 and the rubber cap 18, the writing feel of the position indicator 2 will become bad, and the input pen pressure will become unstable.

However, in the present embodiment, the rod 12 is biased toward a direction in which the pen tip 12a protrudes to the outside from the opening 20 of the case 11. Thus, when no pen pressure is applied to the rod 12, the rod 12 may be biased toward a direction in which the rod 12 moves away from the operating position of the variable capacitor 15 while the sealing state between the rod 12 and the through-hole 36 is maintained. As a result, it is possible to avoid the case where the rod 12 is fixed at the operating position of the variable capacitor 15 and the variable capacitor 15 is constantly in ON state due to the friction between the rod 12 and the rubber cap 18.

Further, when a pen pressure is applied to the rod 12, due to the elastic deformation of the tapered portion 34 of the rubber cap 18, it is possible to restrain the effect of the friction caused by the contact between the rod 12 and the rubber cap 18. As a result, it is possible to prevent the deterioration of the writing feel of the position indicator 2 and stabilize the pen pressure input to the rod 12.

[Modifications of the Rod]

Modifications of the rod 12 will be described below with reference to FIGS. 7 to 10.

[First Modification]

Figure 7:
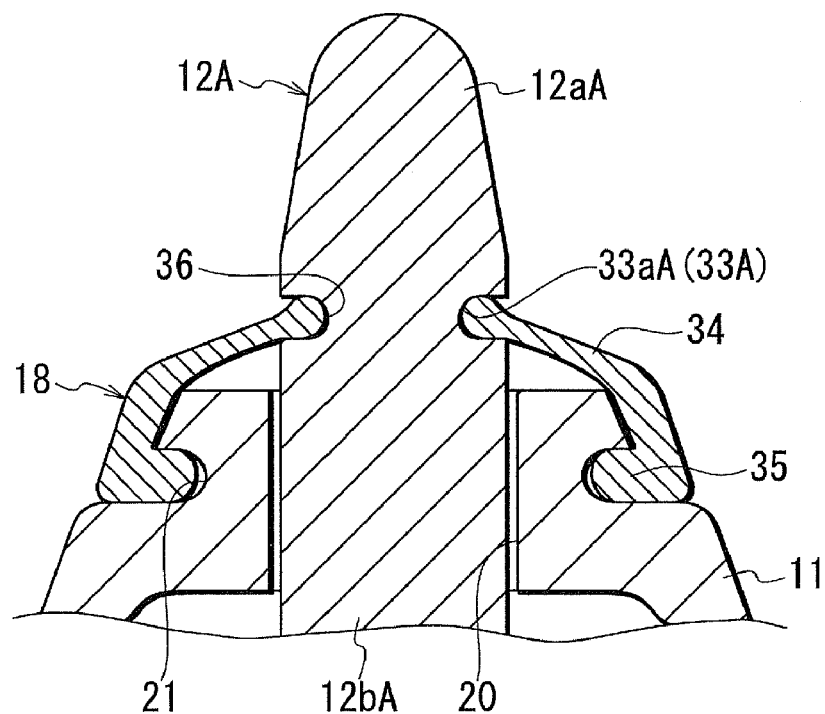
FIG. 7 is a cross section of a first modification of the fitting state between the rod and the elastic member of the position indicator according to the first embodiment of the present invention.

As shown in FIG. 7, in a rod 12A according to a first modification, a fitting-receiving portion 33A is formed by a groove 33aA only. The groove 33aA is formed between a pen tip 12aA and a shaft portion 12bA of the rod 12A around the circumference. Further, the rubber cap 18 is fitted into the groove 33aA. With the rod 12A having the aforesaid configuration, the same advantages as those of the rod 12 may also be achieved. Similar to the rod 12, the present structure may also include a configuration in which the pen tip 12aA has at least a recessed portion formed therein, and the through-hole 36 of the rubber cap 18 and the recessed portion are fitted to each other.

[Second Modification]

Figure 8:
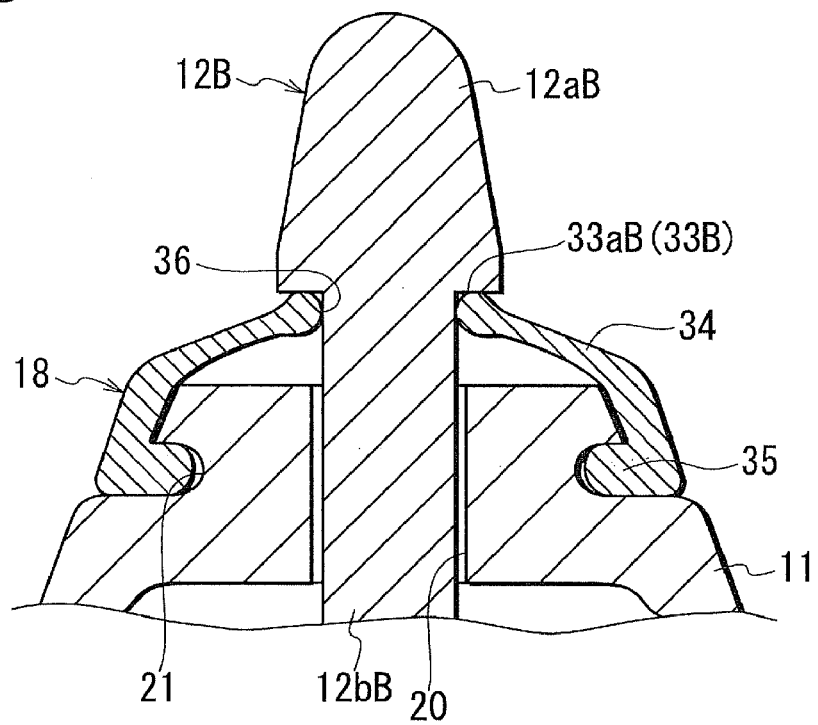
FIG. 8 is a cross section of a second modification of the fitting state between the rod and the elastic member of the position indicator according to the first embodiment of the present invention.

As shown in FIG. 8, in a rod 12B according to a second modification, a fitting-receiving portion 33B is configured as a stepped portion 33aB formed between a pen tip 12aB and a shaft portion 12bB. Further, the edge of the through-hole 36 of the rubber cap 18 abuts a surface of the stepped portion 33aB on the side of the pen tip 12aB, and thereby the rubber cap 18 is fixed to the fitting-receiving portion 33B. With the rod 12B having the aforesaid configuration, the same advantages as those of the rod 12 may also be achieved.

[Third Modification]

Figure 9:
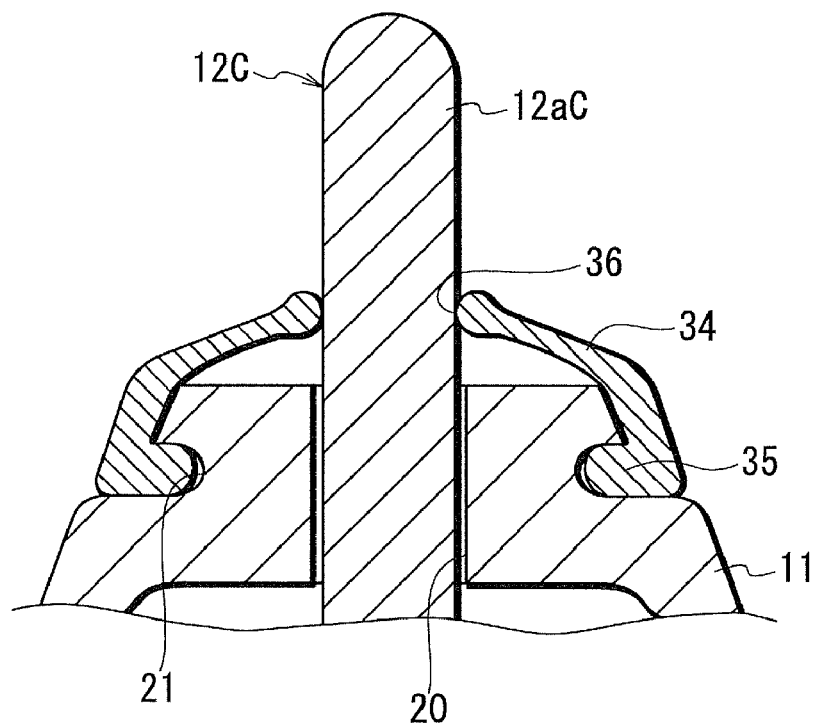
FIG. 9 is a cross section of a third modification of the fitting state between the rod and the elastic member of the position indicator according to the first embodiment of the present invention.

As shown in FIG. 9, in a rod 12C according to a third modification, no fitting-receiving portion is provided, and the rubber cap 18 and the rod 12C are fixed with each other by pressing a pen tip 12aC of the rod 12C into the through-hole 36 of the rubber cap 18. In this modification, it is preferred that the rod 12C and the rubber cap 18 are fixed with each other by an adhesive, so that the gap between the rod 12C and the rubber cap 18 can be reliably filled. With the rod 12C having the aforesaid configuration, the same advantages as those of the rods 12, 12A and 12B may also be achieved.

[Fourth Modification]

Figure 10:
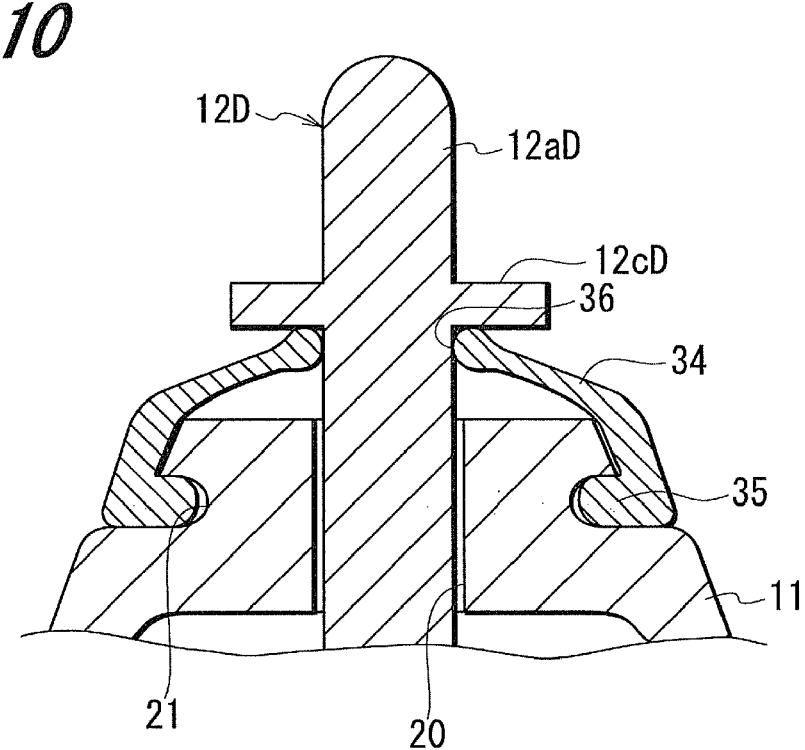
FIG. 10 is a cross section of a fourth modification of the fitting state between the rod and the elastic member of the position indicator according to the first embodiment of the present invention.

A rod 12D according to a fourth modification will be described below with reference to FIG. 10. The rod 12D has a projected portion 12cD provided on a pen tip 12aD thereof. Further, the through-hole 36 of the rubber cap 18 abuts the projected portion 12cD, and thereby the rubber cap 18 is fixed to the rod 12D. With the rod 12D having the aforesaid configuration, the same advantages as those of the rods 12, 12A, 12B and 12C may also be achieved.

[Modification of the Rubber Cap]

A modification of the rubber cap 18 will be described below with reference to FIG. 11.

Figure 11:
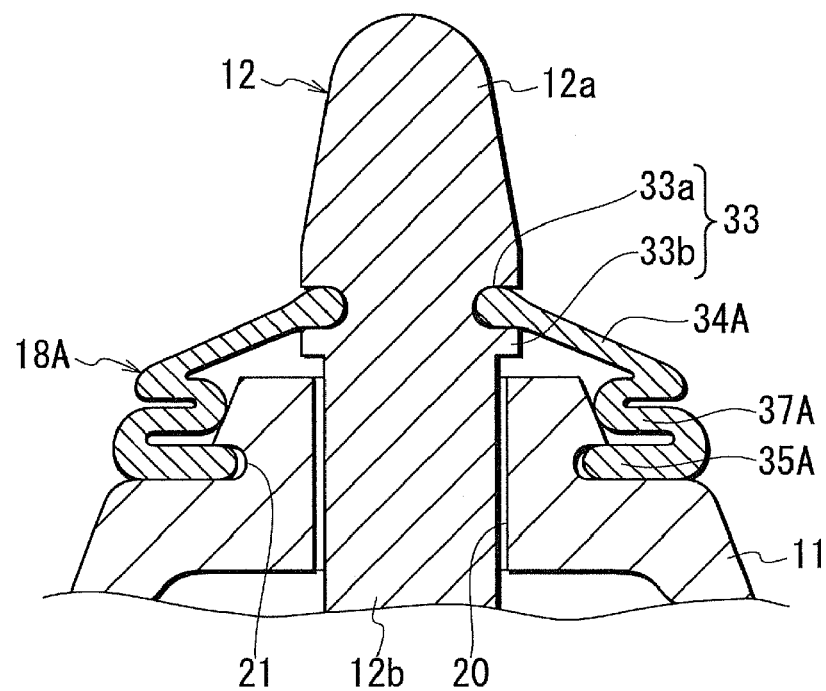
FIG. 11 is a cross section of a modification of the elastic member of the position indicator according to the first embodiment of the present invention.

As shown in FIG. 11, in a rubber cap 18A according to the aforesaid modification, a biasing portion 37A is provided between a tapered portion 34A and a fixing portion 35A. The biasing portion 37A is formed into a bellows-like shape so as to obtain elasticity. The biasing portion 37A biases the rod 12 toward the outside from the opening 20 of the case 11. With the rubber cap 18A having the aforesaid configuration, the same advantages as those of the rubber cap 18 may also be achieved.

1-2. Circuit Configuration of Input Device

Figure 12:
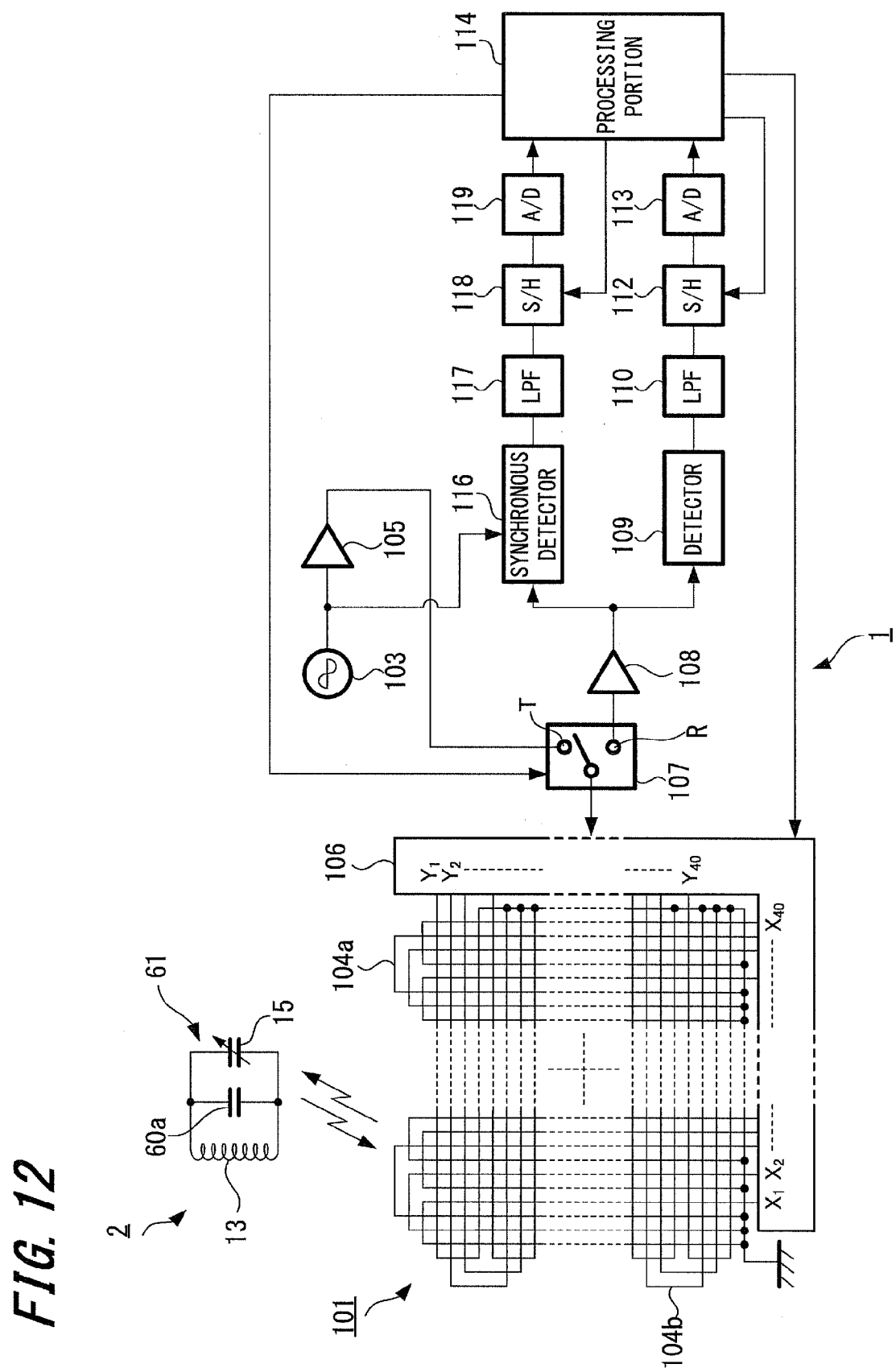
FIG. 12 is a block diagram of a circuit configuration of a position detecting device and the position indicator according to the present invention.

A circuit configuration example of a concrete embodiment of the input device 10 according to the present invention will be described below with reference to FIG. 12. FIG. 12 is a block diagram of a circuit configuration of the position indicator 2 and the position detecting device 1 according to the present invention.

The position indicator 2 includes a resonant circuit 61 that comprises the coil 13, the variable capacitor 15 connected to the coil 13, and a resonant capacitor 60a connected in parallel with the variable capacitor 15.

The position detecting device 1 has a position detecting coil 101 configured by superimposing an X-axis direction loop coil group 104a and a Y-axis direction loop coil group 104b to each other. Each of the loop coil groups 104a, 104b may comprise, for example, forty rectangular loop coils. The loop coils of each of the loop coil group 104a and loop coil group 104b are sequentially overlapped with each other so that the loop coils are shifted from each other at an equal interval.

Further, the position detecting device 1 includes a selecting circuit 106 to which the X-axis direction loop coil group 104a and the Y-axis direction loop coil group 104b are connected. The selecting circuit 106 sequentially selects a loop coil from the loop coil group 104a and loop coil group 104b.

The position detecting device 1 further includes an oscillator 103, a current driver 105, a switching circuit 107, a receiving amplifier 108, a detector 109, a low-pass filter (LPF) 110, a S/H (sample-and-hold) circuit 112, an A/D (analog to digital) conversion circuit 113, a synchronous detector 116, a low-pass filter 117, a S/H circuit 118, an A/D conversion circuit 119, and a processing portion 114.

The oscillator 103 generates an AC signal having a frequency f0, and supplies the AC signal to the current driver 105 and the synchronous detector 116. The current driver 105 converts the AC signal supplied from the oscillator 103 into a current and sends the current to the switching circuit 107. The switching circuit 107 switches the connection of the loop coil selected by the selecting circuit 106 between terminals to be connected (i.e., a transmission side terminal T and a reception side terminal R) under the control of the processing portion 114, which is to be described later. Among the terminals to be connected, the transmission side terminal T has the current driver 105 connected thereto, and the reception side terminal R has the receiving amplifier 108 connected thereto.

The induced voltage generated by the loop coil selected by the selecting circuit 106 is supplied to the receiving amplifier 108 through the selecting circuit 106 and the switching circuit 107. The receiving amplifier 108 amplifies the induced voltage supplied from the loop coil and sends the amplified induced voltage to the detector 109 and the synchronous detector 116.

The detector 109 detects the induced voltage generated by the loop coil (namely, the detector 109 detects a received signal) and sends the detected signal to the low-pass filter 110. The low-pass filter 110, which has a cut-off frequency sufficiently lower than the frequency f0, converts the signal output from the detector 109 into a DC signal, and sends the DC signal to the S/H circuit 112. The S/H circuit 112 holds a voltage value of the signal output from the low-pass filter 110 at a predetermined timing (more specifically, at a predetermined time during a reception period), and sends the held value to the A/D conversion circuit 113. The A/D conversion circuit 113 analog/digital converts the value output from the S/H circuit 112, and outputs the result to the processing portion 114.

On the other hand, the synchronous detector 116 synchronous-detects the output signal from the receiving amplifier 108 with the AC signal from the oscillator 103, and sends a signal, whose level varies corresponding to the phase difference between the both signals, to the low-pass filter 117. The low-pass filter 117, which has a cut-off frequency sufficiently lower than the frequency f0, converts the signal output from the synchronous detector 116 into a DC signal, and sends the DC signal to the S/H circuit 118. The S/H circuit 118 holds a voltage value of the output signal from the low-pass filter 117 at a predetermined timing, and sends the held value to the A/D conversion circuit 119. The A/D conversion circuit 119 analog/digital converts the value output from the S/H circuit 118, and outputs the result to the processing portion 114.

The processing portion 114 controls the respective sections of the position detecting device 1. Specifically, the processing portion 114 respectively controls the selecting operation of the loop coil performed by the selecting circuit 106, the switching operation performed by the switching circuit 107, and the determination of the timing at which the S/H circuits 112 and 118 hold the voltage value. Further, based on the signals input from the A/D conversion circuits 113 and 119, the processing portion 114 makes the X-axis direction loop coil group 104a and the Y-axis direction loop coil group 104b transmit an electromagnetic wave for a predetermined period.

Due to induction of the electromagnetic wave transmitted from the position indicator 2, induced voltages are generated by the respective loop coils of the X-axis direction loop coil group 104a and Y-axis direction loop coil group 104b. Based on the level of the induced voltages generated by respective loop coils of the X-axis direction loop coil group 104a and Y-axis direction loop coil group 104b, the processing portion 114 calculates the coordinate values of the position indicated by the position indicator 2 in both the X-axis direction and the Y-axis direction. Further, the processing portion 114 detects the pen pressure based on the phase difference between the transmitted electromagnetic wave and the received electromagnetic wave.

Figure 13:
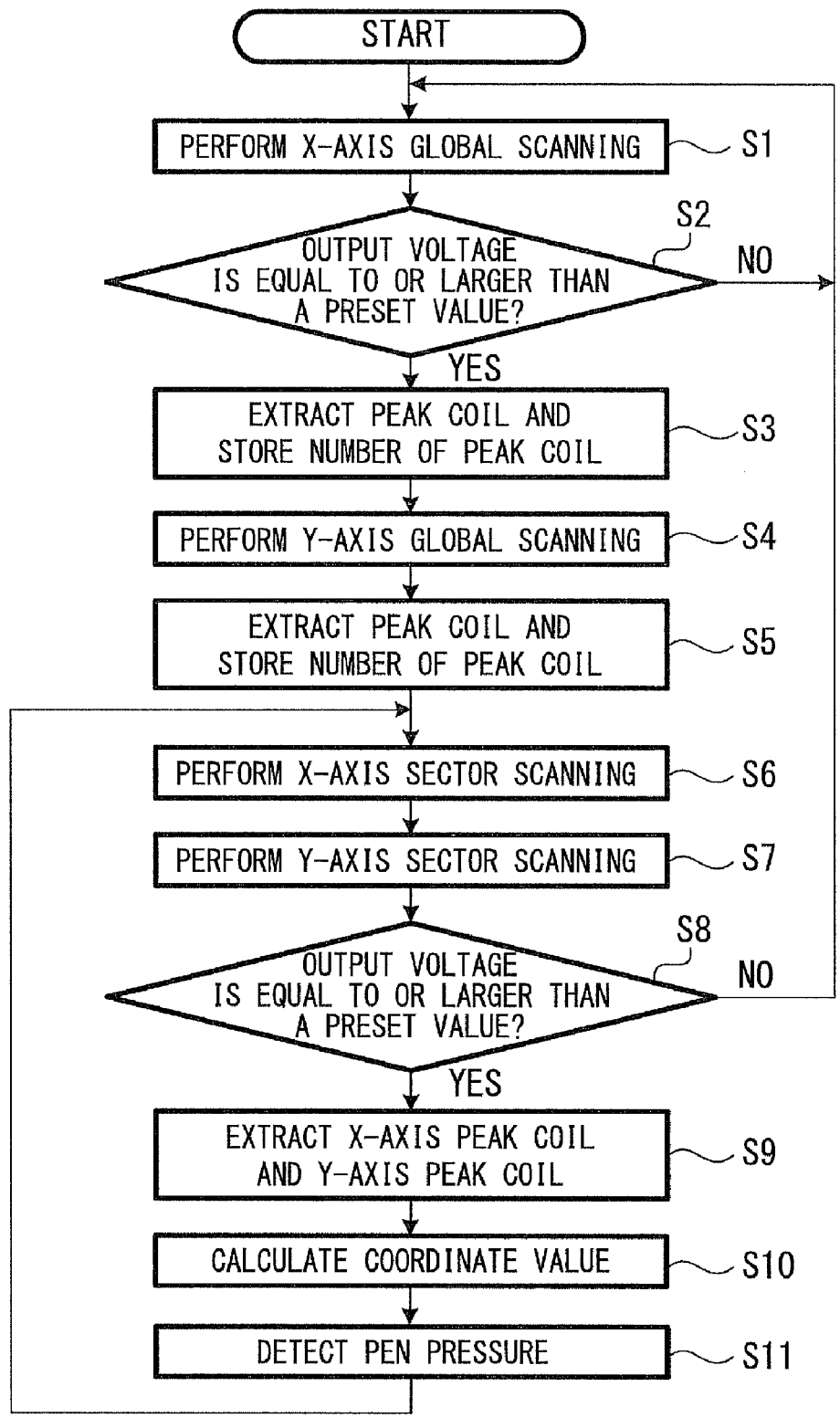
FIG. 13 is a flowchart of a process executed by a processing portion of the position detecting device of the input device according to the present invention.

The operation of the position detecting device 1 following the processing flow of the processing portion 114 will be described below with reference to FIG. 13. FIG. 13 is a flowchart illustrating a process executed by the processing portion 114.

First, the processing portion 114 sequentially scans/selects the respective loop coils of the X-axis direction loop coil group 104a (Step S1). The operation of sequentially scanning/selecting the loop coils is referred to as "global scanning" hereinafter. Specifically, the processing portion 114 sends information to the selecting circuit 106 to make it select a first loop coil (loop coil $X_1$, for example) from the X-axis direction loop coil group 104a and sends a signal to the switching circuit 107 to make it select the transmission side terminal T. Thus, a sinusoidal signal having the frequency f0 is supplied from the oscillator 103 to the loop coil $X_1$, and thereby a transmission electromagnetic wave having the frequency f0 is generated by the loop coil $X_1$. At this point, if the position indicator 2 approaches or contacts the upper surface of the position detecting device 1, the resonant circuit 61 having the position indicating coil 13 will be excited by the electromagnetic wave generated by the loop coil $X_1$. As a result, an induced voltage having the frequency f0 will be generated in the resonant circuit 61.

Then, after sending the signal to the switching circuit 107 to make it select the transmission side terminal T for a predetermined period, the processing portion 114 sends a signal to the switching circuit 107 to make it select the reception side terminal R, and thereby the electromagnetic wave generated by the loop coil $X_1$ is eliminated. At this point, the resonant circuit 61, which has the resonant capacitor 60a and the variable capacitor 15, of the position indicator 2 transmits an electromagnetic wave having the frequency f0. Incidentally, the induced voltage generated in the resonant circuit 61 attenuates gradually due to the loss. The loop coil $X_1$ is reversely excited by the electromagnetic wave transmitted from the resonant circuit 61, so that an induced voltage is generated in the loop coil $X_1$.

Next, after sending the signal to the switching circuit 107 to make it select the reception side terminal R for a predetermined period, the processing portion 114 sends a signal to the switching circuit 107 to make it select the transmission side terminal T. Further, the processing portion 114 sends, through the switching circuit 107, information to the selecting circuit 106 to make it select a second loop coil (loop coil $X_2$, for example) from the X-axis direction loop coil group 104a. Thereafter, the processing portion 114 sends a signal to the switching circuit 107 to make it select the reception side terminal R, and thereby performs transmission/reception of electromagnetic wave in the same manner as mentioned above.

Thereafter, the processing portion 114 performs the similar processing, so that 3rd to 40th loop coils (loop coils $X_3$ to $X_{40}$, for example) of the X-axis direction loop coil group 104a are sequentially scanned/selected. As a result, transmission/reception of the electromagnetic wave is performed on each of loop coils $X_3$ to $X_{40}$.

In Step S1, the processing portion 114 does not have to select every loop coil of the X-axis direction loop coil group 104a, but can be select every other loop coil, every two loop coils or the like. Further, transmission/reception of the electromagnetic wave may also be performed a number of times on the selected loop coil. Furthermore, although the transmission time for each loop coil has to be equal and the same goes for the reception time, the transmission time does not have to be equal to the reception time.

The induced voltage, i.e., the received signal, generated in the loop coil of the X-axis direction loop coil group 104a during the reception period is detected by the detector 109, converted into the DC signal, and smoothed by the low-pass filter 110. Further, the signal output by the low-pass filter 110 is held by the S/H circuit 112 at the predetermined timing, and sent, through the A/D conversion circuit 113, to the processing portion 114 as a voltage value.

Figure 14:
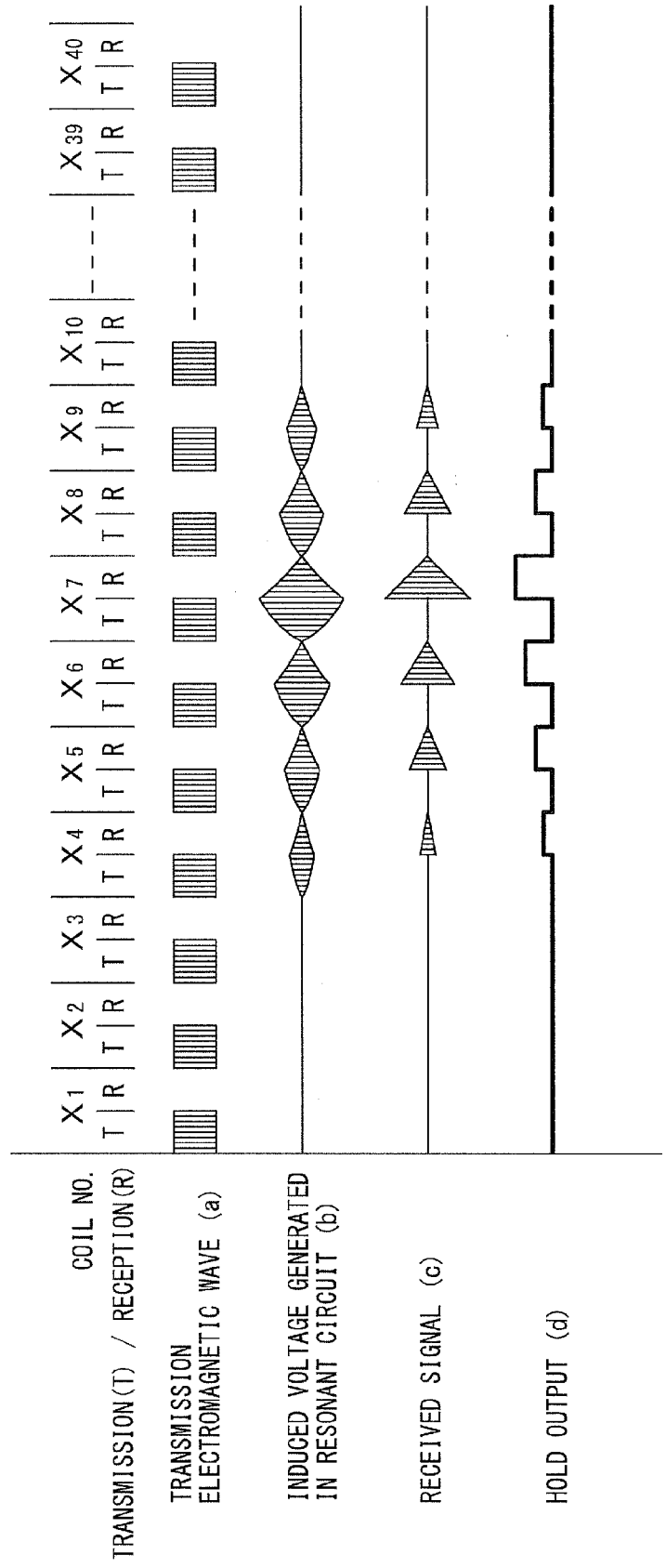
FIG. 14 is a waveform diagram of an example of waveforms of the respective sections of the position detecting device of the input device according to the present invention while performing an X-axis global scanning.

FIG. 14 is a waveform diagram showing an example of waveforms of the respective sections while performing an X-axis global scanning (the processing of Step S1 of FIG. 13). In FIG. 14, (a) represents the electromagnetic wave transmitted from the position detecting coil 101, (b) represents the induced voltage generated in the resonant circuit 61, (c) represents the received signal received by the position detecting device 1, and (d) represents the output signal output by the S/H circuit 112.

Here, the output level of the S/H circuit 112 depends on the distance between the position indicator 2 and the loop coil. Thus, the processing portion 114 determines whether or not the maximum value of the output level of the S/H circuit 112 is equal to or larger than a preset value (Step S2), and thereby determines whether or not the position indicator 2 is located within an effective reading height range of the position detecting device 1.

In Step S2, if it is determined that the maximum value of the output level of the S/H circuit 112 is smaller than the preset value, i.e., if it is determined that the position indicator 2 is not located within the effective reading height range (i.e., a "NO" decision in Step S2), then the processing portion 114 returns the processing to Step S1.

While if it is determined that the position indicator 2 is located within the effective reading height range (i.e., a "YES" decision in Step S2), then the processing portion 114 extracts, among the loop coils $X_1$ to $X_{40}$, a loop coil causing the maximum output level value (referred to as "peak coil" hereinafter), and stores the number of the peak coil (Step S3). Herein the number of the peak coil is $X_7$.

Next, the processing portion 114 sequentially scans/selects the respective loop coils of the Y-axis direction loop coil group 104b, i.e., the processing portion 114 performs the global scanning on the respective loop coils of the Y-axis direction loop coil group 104b (Step S4) to transmit/receive electromagnetic wave to/from the respective loop coils of the Y-axis direction loop coil group 104b.

Figure 15:
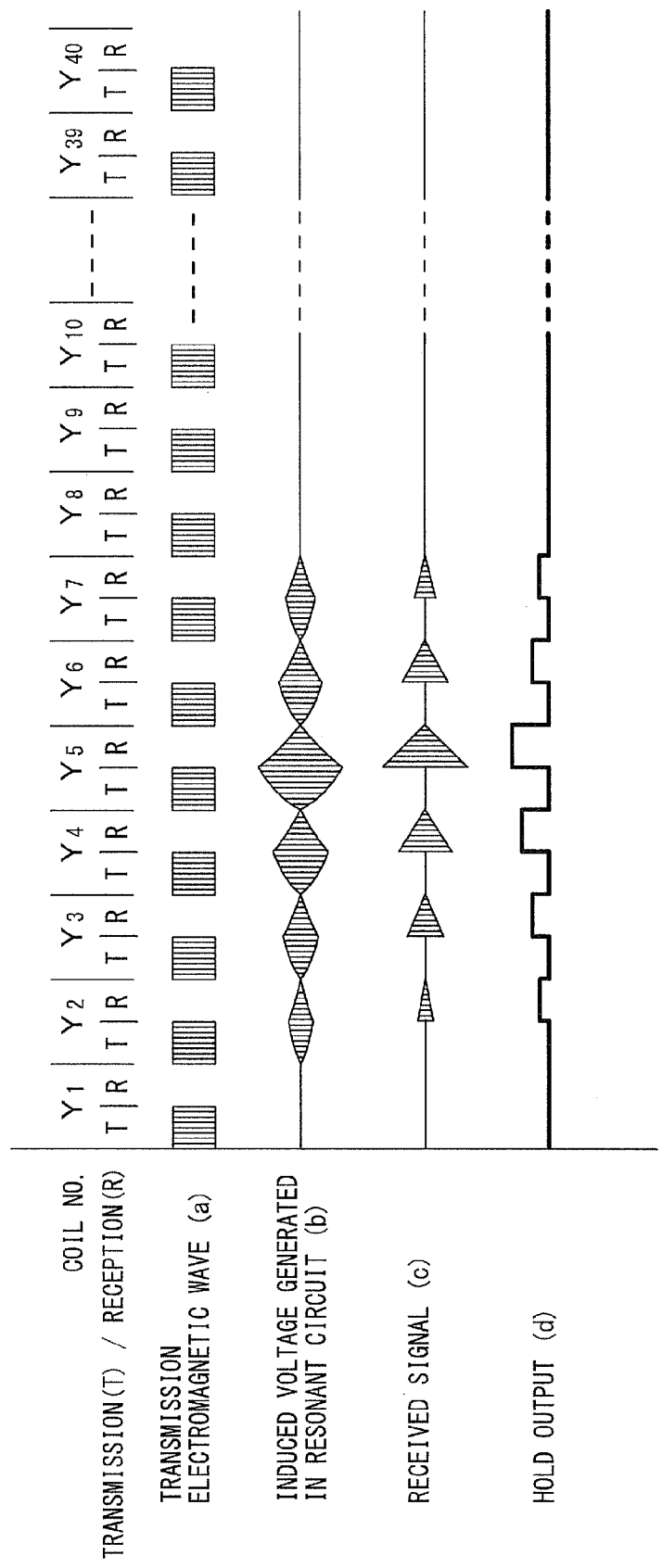
FIG. 15 is a waveform diagram of an example of waveforms of the respective sections of the position detecting device of the input device according to the present invention while performing a Y-axis global scanning.

FIG. 15 is a waveform diagram showing an example of waveforms of the respective sections while performing a Y-axis global scanning. The signals (a), (b), (c), (d) shown in FIG. 15 are the same kind of signals as the signals (a), (b), (c), (d) shown in FIG. 14.

Next, the processing portion 114 extracts, among the loop coils $Y_1$ to $Y_{40}$, a loop coil causing the maximum output level value (referred to as "peak coil" hereinafter), and stores the number of the peak coil (Step S5). Herein the number of the peak coil is $Y_5$.

Next, the processing portion 114 performs transmission/reception of electromagnetic wave on a predetermined number of neighboring loop coils (for example, five loop coils) of the X-axis direction loop coil group 104a with the peak coil as the center. In the transmission/reception operation of the electromagnetic wave, when transmitting electromagnetic wave (namely when the switching circuit 107 selects the transmission side terminal T), the processing portion 114 constantly selects the peak coil (the loop coil $X_7$ in the present embodiment). When receiving the electromagnetic wave (namely when the switching circuit 107 selects the reception side terminal R), the processing portion 114 sequentially scans/selects the loop coils (five loop coils in the present embodiment) in an order from the smallest coil number to the largest coil number, or from the largest coil number to the smallest coil number (Step S6). The operation of sequentially scanning/selecting the loop coils in such a manner is referred to as "sector scanning" hereinafter.

After the X-axis sector scanning is completed, the processing portion 114 performs transmission/reception of electromagnetic wave to a predetermined number of loop coils (for example, five loop coils) of the Y-axis direction loop coil group 104b with the peak coil as the center. In the transmission/reception operation of the electromagnetic wave, when transmitting electromagnetic wave (namely when the switching circuit 107 selects the transmission side terminal T), the processing portion 114 constantly selects the peak coil (the loop coil $Y_5$ in the present embodiment). When receiving the electromagnetic wave (namely when the switching circuit 107 selects the reception side terminal R), the processing portion 114 sequentially scans/selects (i.e., performs sector scanning) the loop coils (five loop coils in the present embodiment) in an order from the smallest coil number to the largest coil number, or from the largest coil number to the smallest coil number (Step S7).

Figure 16:
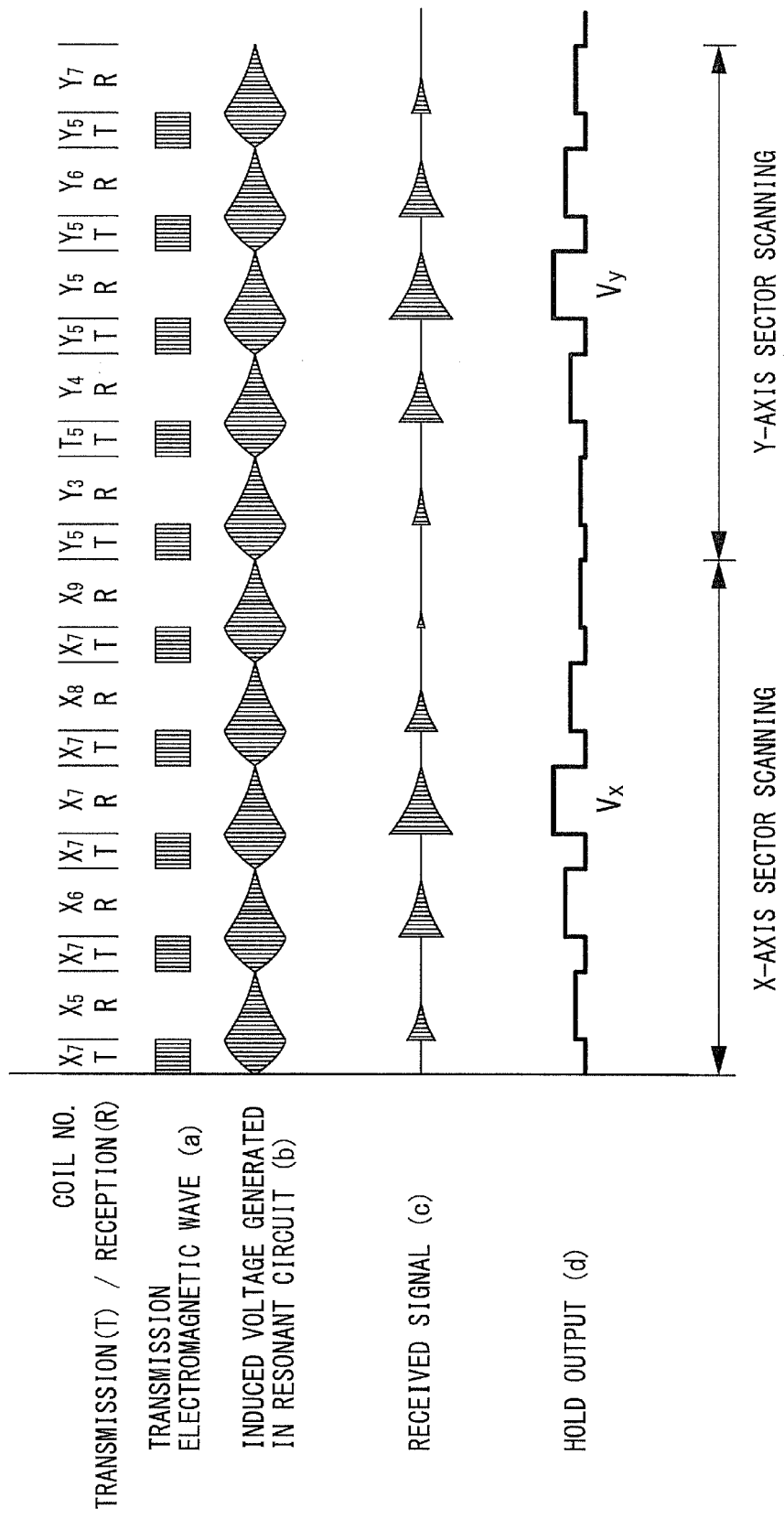
FIG. 16 is a waveform diagram of an example of waveforms of the respective sections of the position detecting device of the input device according to the present invention while performing an X-axis sector scanning and a Y-axis sector scanning.
Figure 17:
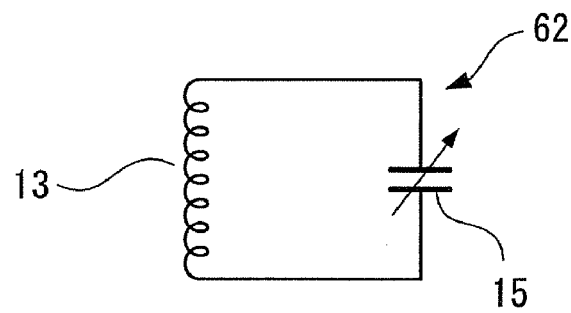
FIG. 17 illustrates another example of a resonant circuit of the position indicator according to the present invention.

FIG. 17 is a waveform diagram showing an example of waveforms of the respective sections while performing an X-axis sector scanning and a Y-axis sector scanning. The signals (a), (b), (c), (d) shown in FIG. 16 are the same kind of signals as the signals (a), (b), (c), (d) shown in FIGS. 14 and 15.

After the Y-axis sector scanning is completed, the processing portion 114 determines whether or not the maximum value of the induced voltage obtained in the processing of Steps S6 and S7 is equal to or larger than the preset value (Step S8), and thereby determines whether or not the position indicator 2 is located within the effective reading height range of the position detecting device 1.

In the processing of Step S8, if it is determined that the maximum value of the output level of the S/H circuit 112 is smaller than the preset value, i.e., if it is determined that the position indicator 2 is not located within the effective reading height range (i.e., "NO" in Step S8), then the processing portion 114 returns the processing to Step S1.

If it is determined that the position indicator 2 is located within the effective reading height range (i.e., "YES" in Step S8), then the processing portion 114 extracts the X-axis direction peak coil and Y-axis direction peak coil causing the maximum value, and stores the numbers of the both peak coils (Step S9).

Next, the processing portion 114 extracts a plurality of induced voltages (for example, three induced voltages), in descending order from high level to low level, from the X-axis sector scanning and the Y-axis sector scanning respectively, and calculates, based on the extracted signals, the coordinate values of the position indicated by the position indicator 2 in both the X-axis direction and Y-axis direction (Step S10). The coordinate values in both the X-axis direction and Y-axis direction may be calculated according to a known method disclosed in Japanese Patent No.2131145 previously filed also by the applicant of the present invention.

Next, the processing portion 114 detects the pen pressure based on the signal whose level varies corresponding to the phase difference between the transmitted electromagnetic wave and the received electromagnetic wave (Step S11). Then, as long as the position indicator 2 stays within the effective reading height range, the processing portion 114 repeats the processing of Steps S6 to S11. If it is determined that the position indicator 2 is not located within the effective reading height range (i.e., if it is determined in the processing of Steps S2 and S8 that the maximum value of the output level is smaller than a preset value), then the processing portion 114 returns the processing to Step S1.

Thus, in the position detecting device 1, the processing portion 114 can detect the position where the position indicator 2 has approached. Further, by detecting the phase of the received signal, information about the pen pressure value of the position indicator 2 can be obtained.

FIG. 17 is an illustration showing another example of the resonant circuit provided in the position indicator 2. The resonant circuit is denoted by reference numeral 62. The resonant circuit 62 comprises the position indicating coil 13 and the variable capacitor 15. In the resonant circuit 61 of the position indicator 2 shown in FIG. 12, two capacitors are used, which are the variable capacitor 15 and the resonant capacitor 60a connected in parallel with each other. However, as shown in FIG. 17, the resonant circuit according to the present invention includes a configuration in which only one capacitor (the variable capacitor 15) is used.

Figure 18:
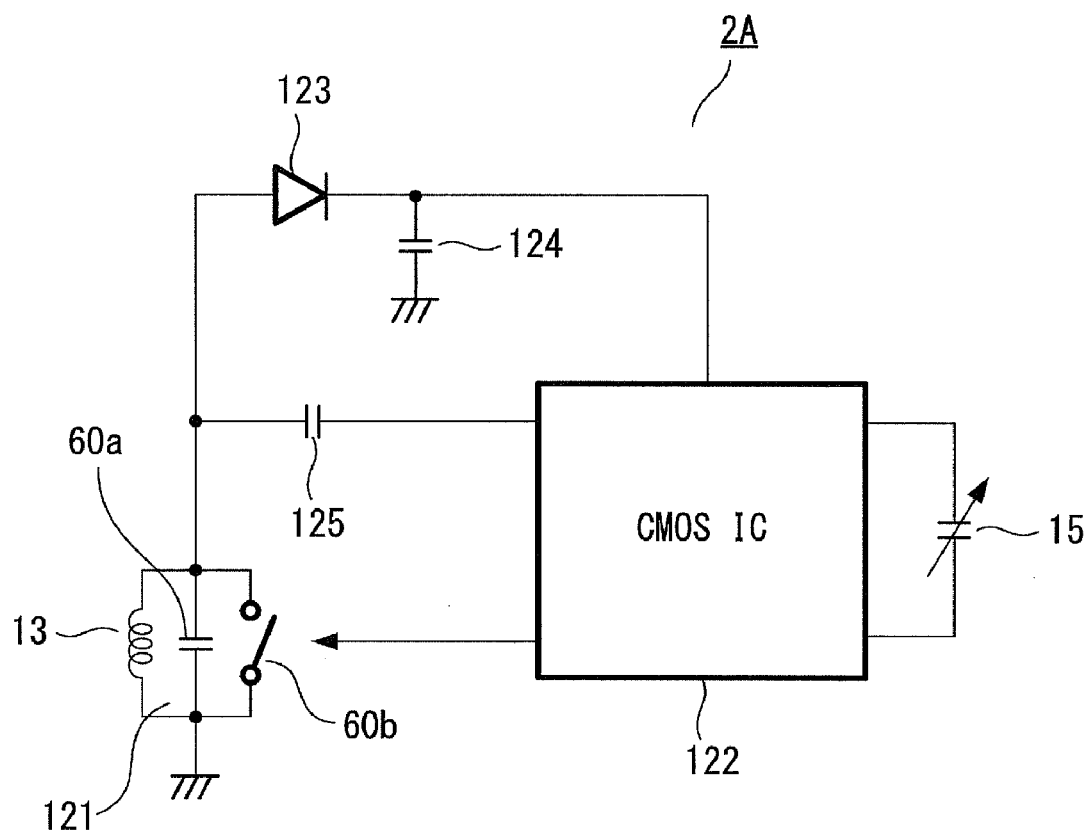
FIG. 18 is an electrical circuit diagram of another embodiment of the circuit configuration of the position indicator according to the present invention.

Next, another embodiment of the circuit configuration of the position indicator according to the present invention will be described below with reference to FIG. 18. FIG. 18 is an electrical circuit diagram showing another embodiment of the circuit configuration of the position indicator according to the present invention. Incidentally, in FIG. 18, components identical to those in FIG. 12 are denoted by the same reference numerals as of FIG. 12, and detailed explanation thereof will be omitted.

In this embodiment, the position indicator is denoted by reference numeral 2A. The position indicator 2A has a resonant circuit 121 which resonates with a signal having a frequency f0 output from the position detecting coil 101 (see FIG. 12) provided in the position detecting device 1. The resonant circuit 121 comprises the coil 13 and the resonant capacitor 60a. Further, an integrated circuit 122 based on a well-known CMOS (Complementary Metal Oxide Semiconductor) technology is mounted on a circuit board of the position indicator 2A. The integrated circuit 122 is driven by a driving power generated by a diode 123 and a capacitor 124.

The diode 123 is connected to the resonant circuit 121. Further, an AC voltage generated in the resonant circuit 121 based on an excitation signal supplied from the position detecting coil 101 is applied to the diode 123. The AC voltage is rectified by the diode 123 and the capacitor 124 and converted into a DC voltage so as to serve as the driving power for driving the integrated circuit 122. Further, the signal generated by the resonant circuit 121 is supplied to the integrated circuit 122 through a capacitor 125. Based on the signal supplied through the capacitor 125, the integrated circuit 122 generates a clock signal for sending/receiving signals between the position indicator 2A and the position detecting device 1 and a clock signal for detecting the pen pressure.

As described above, the capacitance of the variable capacitor 15 changes in response to the pen pressure applied to the core 12 (see FIG. 2). The variable capacitor 15 is connected to a resistor (not shown) to form a time-constant circuit. Thus, when the capacitance of the variable capacitor 15 changes in response to the pen pressure, the time constant of the time-constant circuit will change. Further, the time constant is converted by the integrated circuit 122 to a pen pressure value of a predetermined bits (for example, 8 bits).

The pen pressure data (the pen pressure value of 8 bits) obtained in such a manner is output from the integrated circuit 122 bit by bit in synchronization with the clock signal, which is provided for sending/receiving signals between the position detecting device 1 and the position indicator 2A. By outputting the pen pressure data, the integrated circuit 122 controls the ON/OFF operation of a switch 60b connected in parallel to the resonant circuit 121. Thus, when the switch 60b is turned off, the signal output from the position indicator 2A is detected by the position detecting device 1. When the switch 60b is turned on, since the resonant circuit 121 is shunted, the signal output from the position indicator 2A cannot be detected by the position detecting device 1.

Thus, by transmitting the excitation signal for supplying power to the position indicator 2A from the position detecting coil 101 for a predetermined time and then detecting the signal transmitted from the position indicator 2A, the position detecting device 1 obtains the pen pressure applied to the rod 12.

<2. Second Embodiment>

An input device 40 according to a second embodiment will be described below with reference to FIG. 19.

The position indicator 40 according to the second embodiment differs from the position indicator 2 according to the first embodiment in that the shape of the rubber cap (the elastic member) and the shape of the tip-end portion of the case are different than those of the first embodiment. The description hereinafter will be directed to the rubber cap and the case only, while like components are denoted by same numerals as those of the position indicator 2 of the first embodiment and the explanation thereof will not be repeated.

Figure 19:
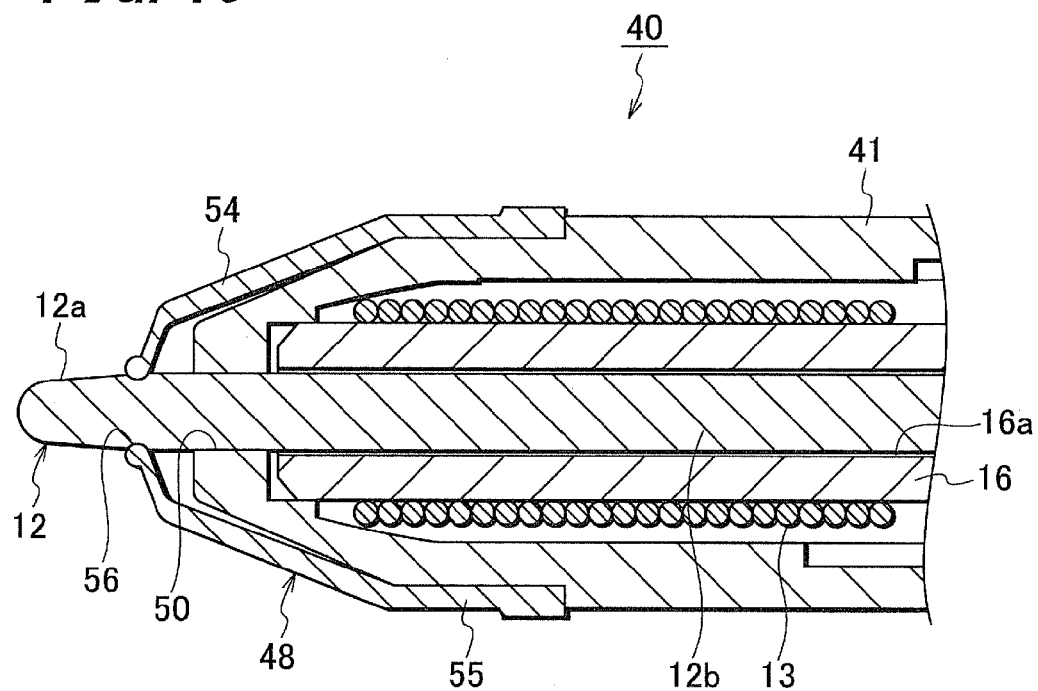
FIG. 19 is a cross section of a position indicator according to a second embodiment of the present invention.

As shown in FIG. 19, a rubber cap 48 is attached to a case 41 of the position indicator 40 so that substantially the entire tip end portion on the side of one end in the axial direction of the case 41 is covered by the rubber cap 48. The rubber cap 48 includes a tapered portion 54 having a through-hole 56 through which the rod 12 is passed, and a fixing portion 55 formed continuously from the tapered portion 54.

The tapered portion 54 is substantially cone-shaped to correspond to the shape of the tip end portion of the case 41. The tip end of the tapered portion 54 is formed with the through-hole 56 through which the rod 12 is passed. Further, the fixing portion 55 is continuously formed from an end portion of the tapered portion 54 opposite the end portion where the through-hole 56 is formed.

The fixing portion 55 is formed in substantially circular tube-like shape, and the inner wall of the fixing portion 55 tightly contacts the circumferential surface on one end side in the axial direction of the case 41. The diameter of the inner wall of the fixing portion 55 is substantially equal to or smaller than the outer diameter of the one end side in the axial direction of the case 41. Thus, the fixing portion 55 of the rubber cap 48 and the case 41 are tightly fitted to each other. Incidentally, the fixing portion 55 of the rubber cap 48 may also be fixed to case 41 by an adhesive.

Since other structures are identical to those of the position indicator 2 of the first embodiment, description thereof will be omitted. With the position indicator 40 having the aforesaid configuration, the same advantages as those of the position indicator 2 of the first embodiment may also be achieved.

<3. Third Embodiment>

An input device 70 according to a third embodiment will be described below with reference to FIG. 20.

The position indicator 70 according to the third embodiment has a configuration in which the biasing means and the elastic member are separately formed. Note that in the following description of the position indicator 70, like components are denoted by same numerals as those used in the description of the position indicator 2 of the first embodiment and the explanation thereof will not be repeated.

Figure 20:
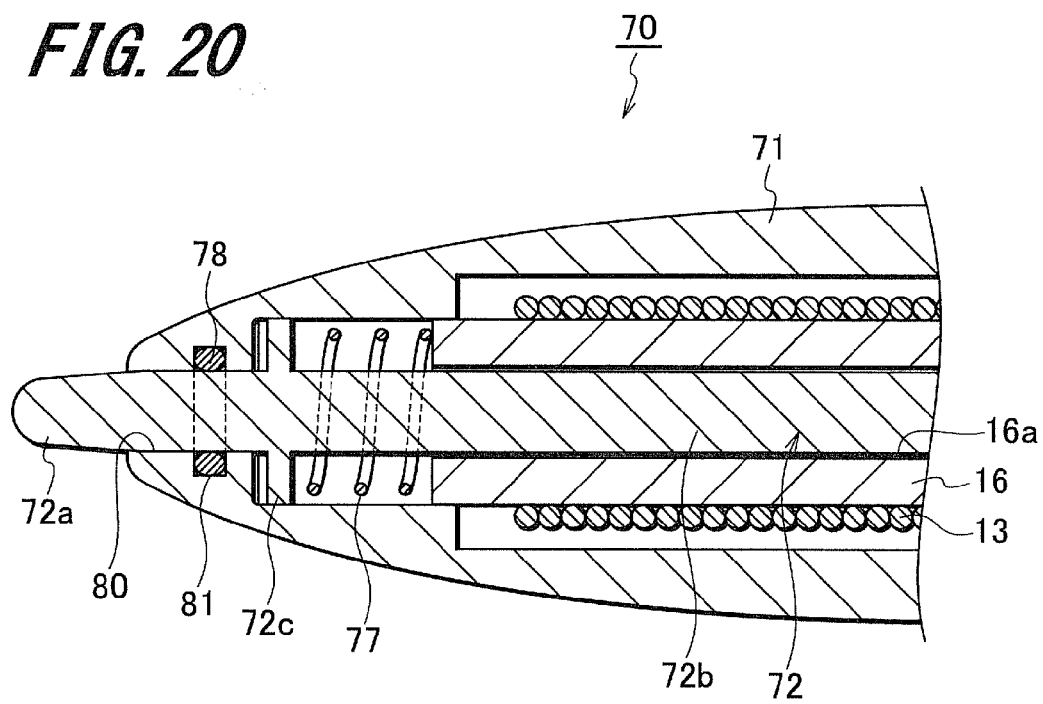
FIG. 20 is a cross section of a position indicator according to a third embodiment of the present invention.

As shown in FIG. 20, in the position indicator 70 according to the third embodiment, a fitting groove 81 is formed in an inner wall of an opening 80 formed on the side of one end in the axial direction of the case 71. The fitting groove 81 is continuously formed along the circumferential direction of the inner wall of the case 71. Further, an O-ring 78 (which is another concrete example of the elastic member) is fitted into the fitting groove 81.

Further, an abutting portion 72*c* is provided between a pen tip 72*a* and a shaft portion 72*b* of a rod 72. The abutting portion 72*c* is a flange-like protuberance continuously protruding around the circumference of the shaft portion 72*b*. The abutting portion 72*c*, along with the shaft portion 72*b*, is housed in the case 71. Further, a coil spring 77, which is another concrete example of the biasing means, is provided between the abutting portion 72*c* of the rod 72 and the side of the one end of the ferrite core 16 in a state where the coil spring 77 is compressed. With such a configuration, due to the elastic force of the coil spring 77, the rod 72 is constantly biased toward a direction in which the rod 72 protrudes outside of the case 71.

Since other structures are identical to those of the position indicator 2 of the first embodiment, description thereof will be omitted. With the position indicator 70 having the aforesaid configuration, the same advantages as those of the position indicator 2 of the first embodiment may also be achieved.

<4. Fourth Embodiment>

An input device 70A according to a fourth embodiment will be described below with reference to FIG. 21.

Similar to the position indicator 70 of the third embodiment, the position indicator 70A according to the fourth embodiment has a configuration in which the biasing means and the elastic member are separately formed. Further, in the position indicator 70A, a coil spring 77A (the biasing means) is attached at substantially the center in the axial direction of a rod 72A.

Figure 21:
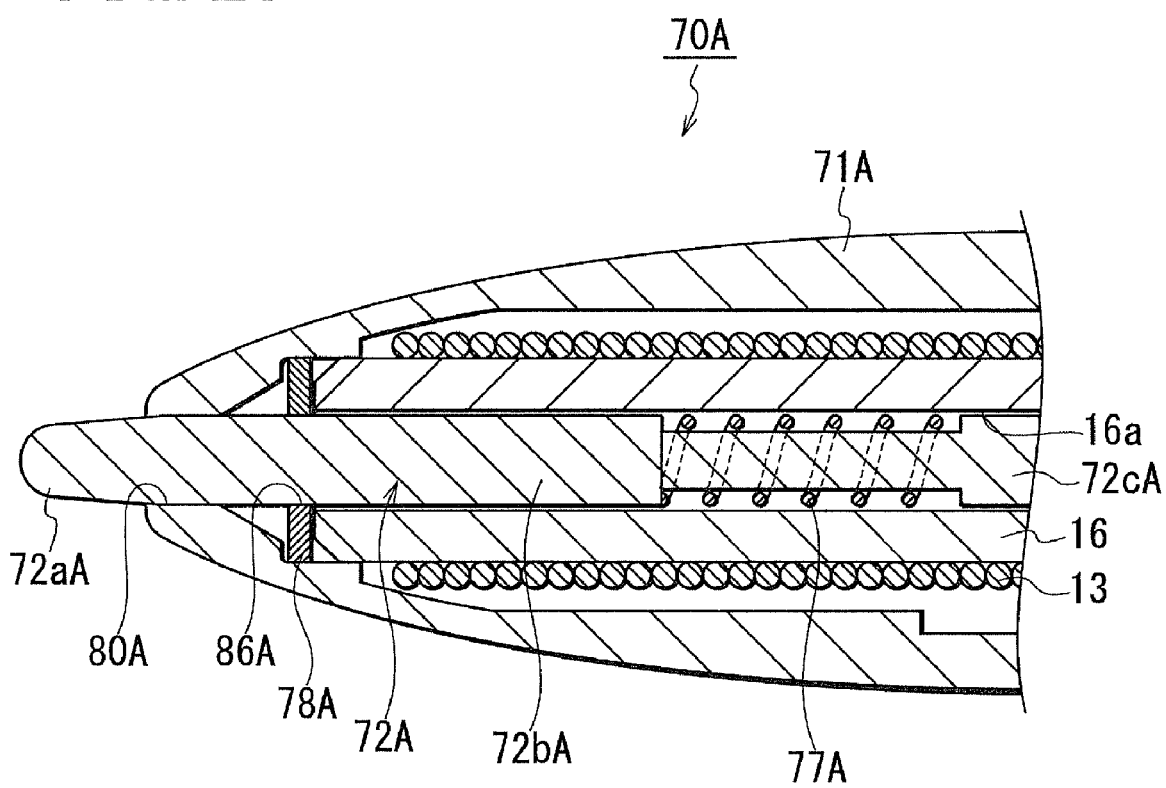
FIG. 21 is a cross section of a position indicator according to a fourth embodiment of the present invention.

As shown in FIG. 21, the rod 72A includes a first shaft portion 72*b*A continuing from a pen tip 72*a*A, and a second shaft portion 72*c*A. The second shaft portion 72*c*A is provided on the side of the other end of the first shaft portion 72*b*A, and is connected to the first shaft portion 72*b*A though the coil spring 77A. The coil spring 77A is arranged between the first shaft portion 72*b*A and the second shaft portion 72*c*A in a state where the coil spring 77A is compressed. With such a configuration, due to the elastic force of the coil spring 77A, the first shaft portion 72*b*A of the rod 72A is constantly biased toward a direction in which the rod 72A protrudes outside of a case 71A.

Further, a plate-like rubber sheet 78A (which is further another concrete example of the elastic member) is provided between the inner wall of the case 71A and the side of one end of the ferrite core 16. The rubber sheet 78A is formed with a through-hole 86A through which the rod 72A is passed.

Since other structures are identical to those of the position indicator 2 of the first embodiment, description thereof will be omitted. With the position indicator 70A having the aforesaid configuration, the same advantages as those of the position indicator 2 of the first embodiment may also be achieved.

Although the position indicator 70 of the third embodiment is described using an example in which the O-ring 78 is used as an elastic member, the rubber sheet 78A used in the position indicator 70A of the fourth embodiment may be used instead of the O-ring 78. Similarly, in the position indicator 70A of the fourth embodiment, the O-ring 78 may be used as the elastic member instead of the rubber sheet 78A.

As described above, in the position indicator according to the present invention, the elastic member such as the rubber cap, the O-ring and the like, provides for sealing a gap between the rod and inner wall of the case. Consequently, water, dust or the like is prevented from entering into the case from the periphery of the rod.

Further, the biasing means for biasing the rod toward the outside from the opening of the case, prevent the rod from being fixed at the operating position of the variable capacitor due to the friction between the rod and the elastic member.

Finally, since the circumferential surface of the variable capacitor is covered by the elastic protective member, water, dust or the like is prevented from entering into the variable capacitor, and therefore waterproof performance of the position indicator is further improved.

It should be noted that the present invention is not limited to the embodiments described above and shown in the drawings but includes various modifications without departing from the spirit of the claims of the present invention.

What is claimed is:

1. A position indicator comprising:
    a case having a hollow housing portion and an opening at an end of the housing portion;
    a rod having a substantially bar-like body and an end, the rod being housed in the housing portion such that the end of the rod protrudes outside the case through the opening;
    a sealing member attached to the opening at the end of the housing portion and having an aperture into which the rod is inserted such that a gap between the aperture and the rod is sealed,
    wherein the sealing member comprises an elastic member having a biasing portion which is configured to bias the rod toward outside the case while maintaining a tight contact with the rod.

2. The position indicator according to claim 1, further comprising electronic circuitry housed in the case.

3. The position indicator according to claim 1, wherein the elastic member is substantially cone-shaped and wherein the aperture is placed at a top portion of the cone.

4. The position indicator according to claim 3, wherein the rod includes a flange extending circumferentially proximate the end of the rod such that the flange abuts an outside surface of the top portion of the elastic member that defines the aperture of the elastic member.

5. The position indicator according to claim 3, wherein the rod includes a groove extending circumferentially proximate the end of the rod and sized to receive an edge of the aperture of the elastic member.

6. The position indicator according to claim 3, wherein the end of the rod comprises a stepped portion formed by a flange and extending from the bar-like body of the rod such that an edge of the aperture of the cone-shaped elastic member abuts the flange of the stepped portion.

7. The position indicator according to claim 3, wherein the rod includes a flange extending circumferentially proximate the end of the rod such that the flange abuts an inside surface of the top portion of the elastic member that defines the aperture of the elastic member.

8. The position indicator according to claim 1, wherein the biasing portion of the elastic member comprises a bellows-like member configured to bias the rod toward outside the case.

9. A position detecting system, comprising:
a position detecting device having a plurality of superimposed position detecting coils and a processing unit; and
a position indicator comprising:
a case having a hollow housing portion and an opening at an end of the housing portion;
a rod having a substantially bar-like body and an end, the rod being housed in the housing portion such that the end of the rod protrudes outside the case through the opening;
a sealing member attached to the opening at the end of the housing portion and having an aperture into which the rod is inserted such that a gap between the aperture and the rod is sealed, and
a resonant circuit housed in the case,
wherein, when the position indicator approaches the position detecting device, the resonant circuit transmits a signal induced by at least one of the plurality of the position detecting coils, and wherein the processing unit determines a position of the position indicator based on the signal transmitted by the resonant circuit and a coordinate value of the at least one coil that induced the signal, and
wherein the sealing member comprises an elastic member having a biasing portion which is configured to bias the rod toward outside the case while maintaining a tight contact with the rod.

10. The position indicator according to claim 9, wherein the elastic member is substantially cone-shaped and wherein the aperture is placed at a top portion of the cone.

11. The position indicator according to claim 10, wherein the rod includes a flange extending circumferentially proximate the end of the rod such that the flange abuts an outside surface of the top portion of the elastic member that defines the aperture of the elastic member.

12. The position indicator according to claim 10, wherein the rod includes a groove extending circumferentially proximate the end of the rod and sized to receive an edge of the aperture of the elastic member.

13. The position indicator according to claim 10, wherein the rod includes a flange extending circumferentially proximate the end of the rod such that the flange abuts an inside surface of the top portion of the elastic member that defines the aperture of the elastic member.

14. The position indicator according to claim 10, wherein the end of the rod comprises a stepped portion formed by a flange and extending from the bar-like body of the rod such that an edge of the aperture of the cone-shaped elastic member abuts the flange of the stepped portion.

15. The position indicator according to claim 9, wherein the biasing portion of the elastic member comprises a bellows-like member configured to bias the rod toward outside the case.

* * * * *